(12) United States Patent
Fukumoto

(10) Patent No.: US 7,859,197 B2
(45) Date of Patent: Dec. 28, 2010

(54) INVERTER USING PWM METHOD

(75) Inventor: Kenichi Fukumoto, Kyoto (JP)

(73) Assignee: Rohm Co., Ltd. (JP)

( * ) Notice: Subject to any disclaimer, the term of this patent is extended or adjusted under 35 U.S.C. 154(b) by 403 days.

(21) Appl. No.: 12/093,851

(22) PCT Filed: Nov. 15, 2006

(86) PCT No.: PCT/JP2006/322771

§ 371 (c)(1),
(2), (4) Date: May 15, 2008

(87) PCT Pub. No.: WO2007/058216

PCT Pub. Date: May 24, 2007

(65) Prior Publication Data

US 2009/0160357 A1    Jun. 25, 2009

(30) Foreign Application Priority Data

Nov. 16, 2005 (JP) ............................ 2005-332199
Nov. 16, 2005 (JP) ............................ 2005-332207

(51) Int. Cl.
*G05F 1/00* (2006.01)
(52) U.S. Cl. .................. 315/291; 315/224; 315/307; 315/274; 315/209 R
(58) Field of Classification Search ................ 315/224, 315/225, 274–282, 289, 291, 209 R, 246, 315/247, 297, 307–311
See application file for complete search history.

(56) References Cited

U.S. PATENT DOCUMENTS 7,417,382 B2 * 8/2008 Lin ............................ 315/225
7,515,446 B2 * 4/2009 Lin ............................ 363/98

FOREIGN PATENT DOCUMENTS

| JP | 1-238467 | 9/1989 |
| JP | 2003-168585 | 6/2003 |
| JP | 2003-323994 | 11/2003 |
| JP | 2004-166445 | 6/2004 |

OTHER PUBLICATIONS

International Preliminary Report on Patentability for International Application No. PCT/JP2006/322771 issued May 20, 2008 with English Translation.
International Search Report for International Application No. PCT/JP2006/322771 mailed Feb. 13, 2007 with English Translation.

* cited by examiner

*Primary Examiner*—Tuyet Thi Vo
(74) *Attorney, Agent, or Firm*—Cantor Colburn LLP

(57) ABSTRACT

The switching timing is flexibly set in an inverter.

An H-bridge circuit is controlled based on a triangular wave signal and an error voltage. To control the circuit, a first high-side transistor and a second low-side transistor are turned on in a first period until the triangular wave signal reaches the error voltage. The first high-side transistor is turned on in a second period until the triangular wave signal reaches a peak edge. A second high-side transistor is turned on in a third period until the triangular wave signal reaches a bottom edge. A first low-side transistor and the second high-side transistor are turned on in a fourth period until the triangular wave signal reaches again the error voltage. The second high-side transistor is turned on in a fifth period until the triangular wave signal reaches again a peak edge. The first high-side transistor is turned on in a sixth period until the triangular wave signal reaches again a bottom edge.

27 Claims, 12 Drawing Sheets

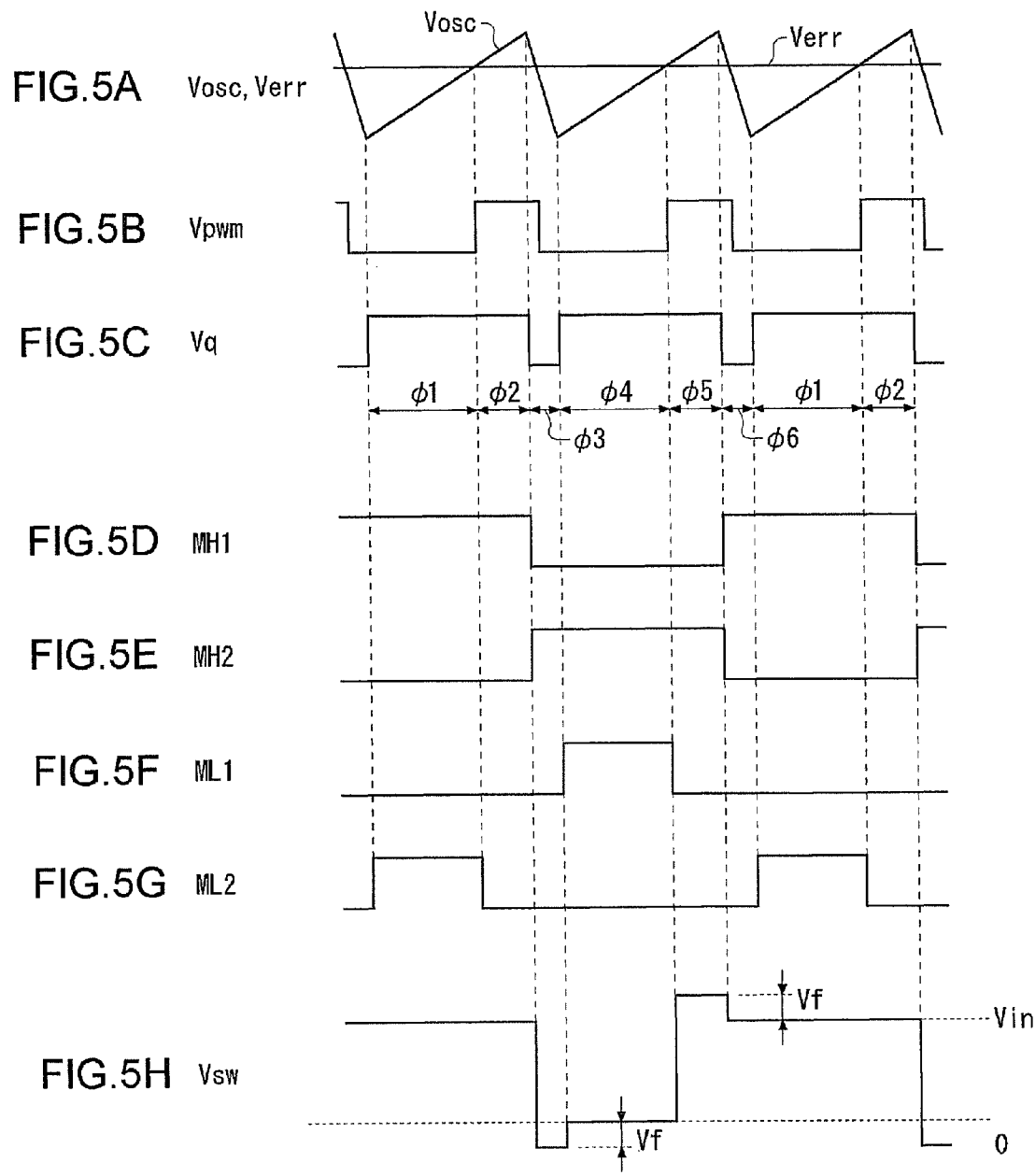

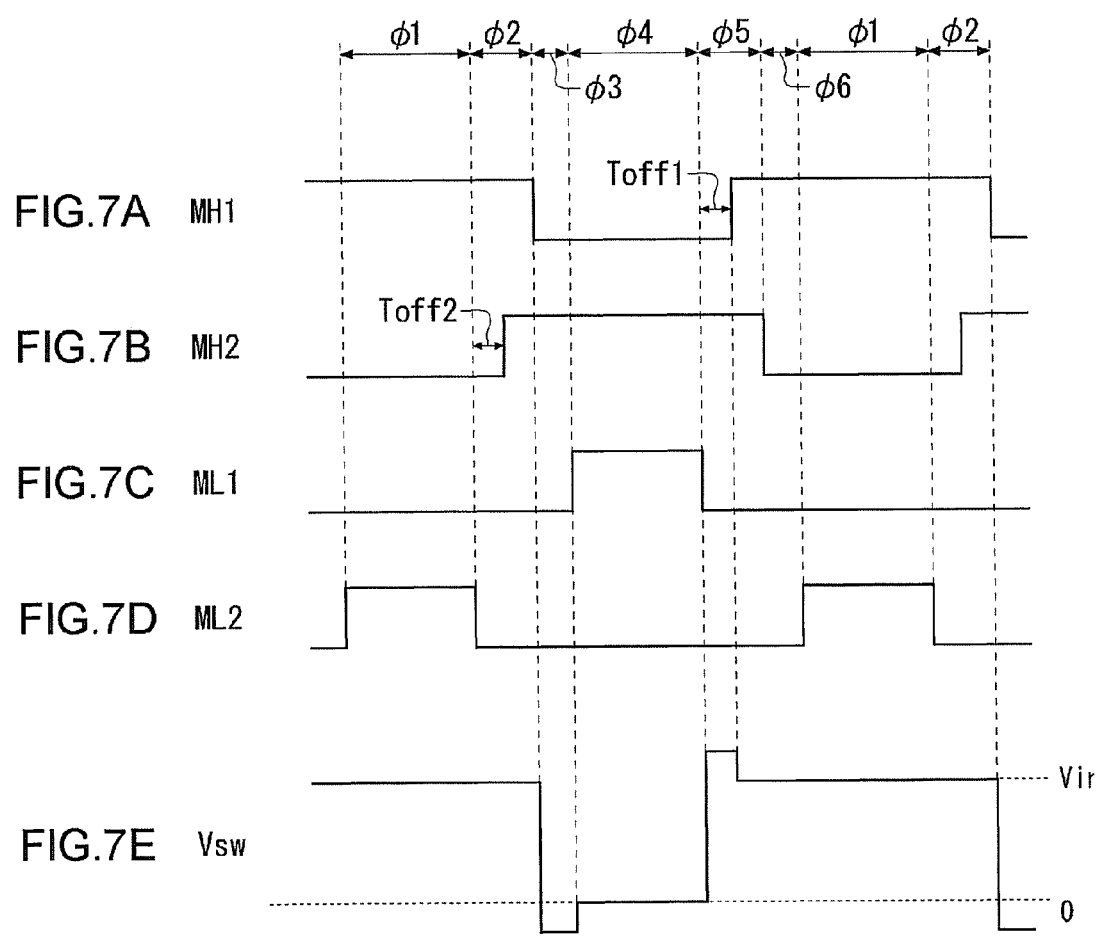

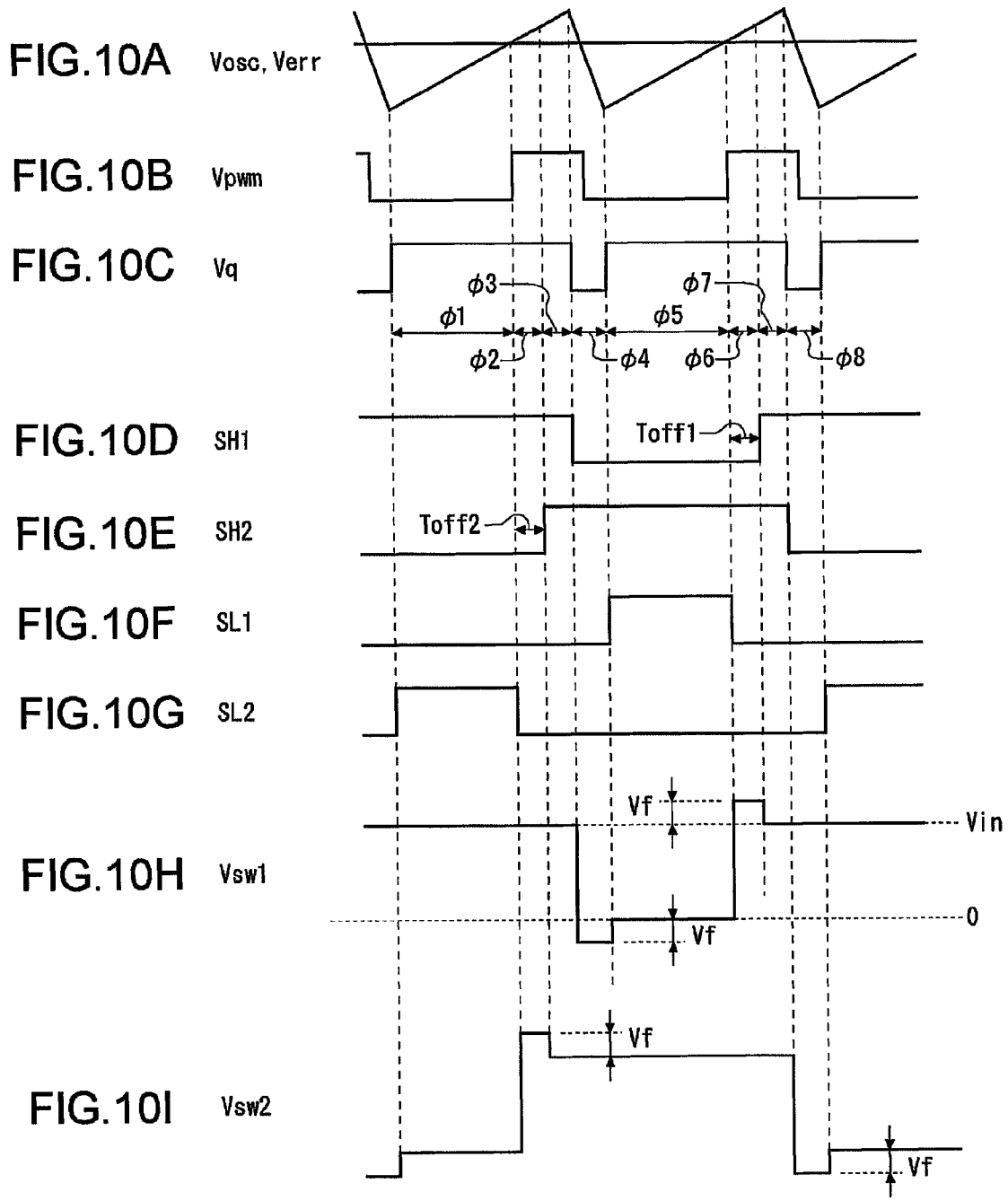

FIG.12A SH1
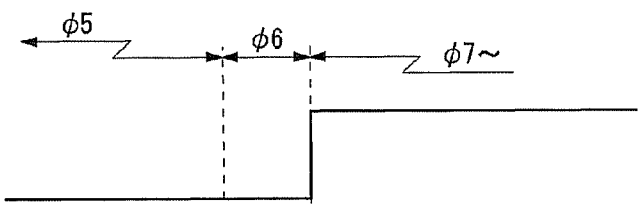
FIG.12B SL1 (=DL1)
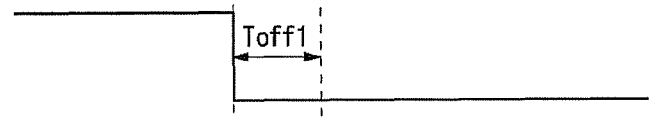
FIG.12C Vsw1
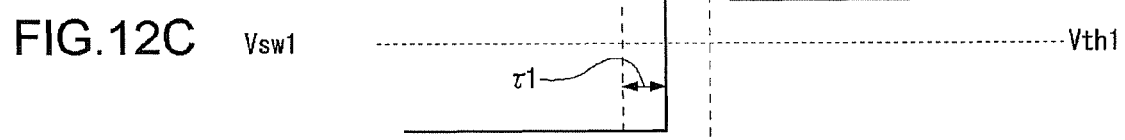
FIG.12D Vcmp1
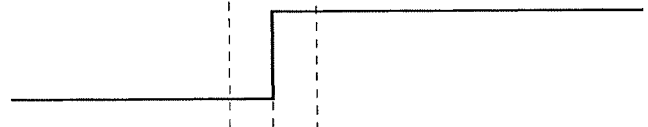
FIG.12E VDH1
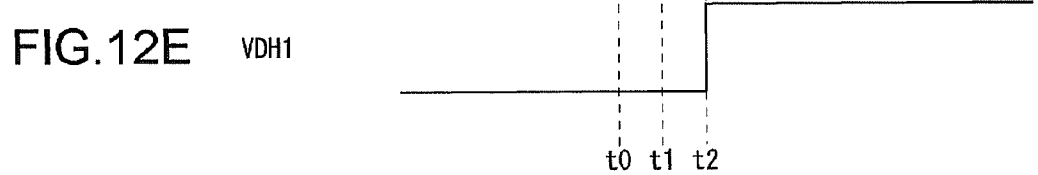

FIG.13A  SH1 
FIG.13B  SL1 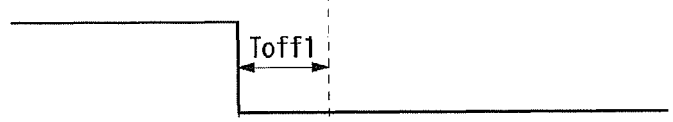
FIG.13C  Vsw1 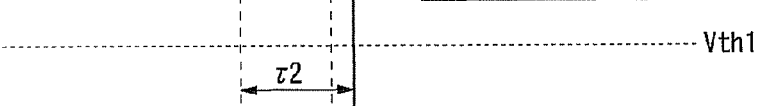
FIG.13D  Vcmp1 
FIG.13E  VDH1 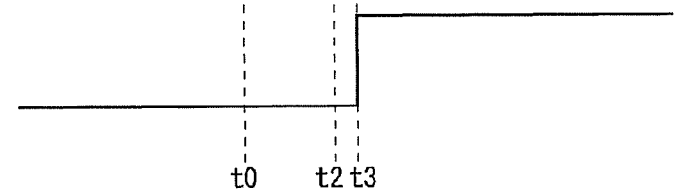

US 7,859,197 B2

INVERTER USING PWM METHOD

CROSS REFERENCE TO RELATED APPLICATIONS

This is a U.S. national stage of application No. PCT/JP2006/322771, filed on 15 Nov. 2006. Priority under 35 U.S.C. §119(a) and 35 U.S.C. §365(b) is claimed from Japanese Application No. 2005-332199, filed 16 Nov. 2005 and Japanese Application No. 2005-332207, filed 16 Nov. 2005, the disclosure of which is also incorporated herein by reference.

BACKGROUND OF THE INVENTION

1. Field of the Invention

The present invention relates to an inverter for supplying a fluorescent lamp and the like with drive voltage and it particularly relates to a drive system including the inverter.

2. Description of the Related Art

In recent years, flat-screen LCDs growing in size and flatter in thickness are in wide use replacing the CRT displays. In the LCD, a plurality of cold cathode fluorescent lamps (hereinafter referred to as CCFL) or external electrode fluorescent lamps (hereinafter referred to as EEFL) are placed on the back surface of LCD panels on which images are displayed, and they emit light as backlight.

An inverter (DC/AC converter), which boosts DC voltage of, for example, about 12 V and outputs it as AC voltage, is used to drive CCFL or EEFL. The inverter converts the current flowing to CCFL, to a voltage and then feeds it back to a control circuit. Based on this fed-back voltage, the inverter controls the on and off of switching elements. For example, Patent Document 1 discloses a technology for driving fluorescent lamps by such an inverter.

[Patent Document 1] Japanese Patent Application Laid-Open No. 2003-323994.

To generate a boosted AC voltage by the inverter, energy needs to be stored by supplying intermittently the switching voltage to a primary coil of a transformer. To supply the switching voltage to the primary coil of a transformer, a method can be employed wherein four switching transistors are configured by a so-called H-bridge circuit or full-bridge circuit so that switching voltage is supplied across the primary coil.

1. In a case when the switching voltage is generated by using such an H-bridge circuit, the timing at which each switching transistor turns on and off has a significant effect on the efficiency of an inverter. Also, when a pair of transistors, connected in series between an input voltage and ground among the switching transistors that configure the H-bridge circuit, turn on simultaneously, a through current flows. Hence, a switching control needs to be performed by providing dead time.

2. Also, in order to switch the on and off of the transistors, gate potential of MOSFETs or base current of bipolar transistors needs to be varied. In the case of MOSFETs, a gate capacitance must be charged or discharged if the gate potential is to be changed. Accordingly, the transistor size becomes larger and therefore the time required for the gate potential to transit becomes longer. As a result, there are cases where a certain delay time occurs from when OFF is specified to a transistor until when the gate potential has transited and turns off. As delay is caused in ON-OFF timing, a pair of transistors, connected in series among the switching transistors constituting the H-bridge circuit, may turn on simultaneously and thereby a through current may flow.

SUMMARY OF THE INVENTION

The present invention has been made in view of the problems described as above, and a general purpose of an embodiment thereof is to provide an inverter capable of flexibly setting the on-off timings of switching transistors in the inverter using an H-bridge circuit.

A general purpose of an embodiment of the present invention is to provide an inverter capable of preventing a through current in the inverter using an H-bridge circuit.

1. An inverter according to one embodiment of the present invention comprises: a transformer; a first high-side transistor one end of which is connected to an input terminal where an input voltage is applied and the other end of which is connected to a first terminal of a primary coil of the transformer; a first low-side transistor one end of which is connected to a potential fixed terminal where a potential is fixed and the other end of which is connected to the first terminal of the primary coil; a second high-side transistor one end of which is connected to the input terminal and the other end of which is connected to a second terminal of the primary coil; a second low-side transistor one end of which is connected to the potential fixed terminal and the other end of which is connected to the second terminal of the primary coil; a current-voltage converter which converts current at a secondary coil of the transformer into voltage so as to be outputted as a detection voltage; a triangular wave signal generator which generates a triangular wave signal; an error amplifier which outputs an error voltage corresponding to error between the detection voltage and a predetermined reference voltage; and a logic control unit which controls on and off of the first and the second high-side transistor and the first and the second low-side transistor, based on the error voltage outputted from the error amplifier and the triangular wave signal generated by the triangular wave signal generator. The logic control unit turns on the first high-side transistor and the second low-side transistor in a first period during which the triangular wave signal starts from a bottom edge thereof until it reaches the error voltage, then the logic control circuit turns on the first high-side transistor in a second period until the triangular wave signal reaches a peak edge, then the logic control circuit turns on the second high-side transistor in a third period until the triangular wave signal reaches a bottom edge, then the logic control circuit turns on the first low-side transistor and the second high-side transistor in a fourth period until the triangular wave signal reaches again the error voltage, then the logic control circuit turns on the second high-side transistor in a fifth period until the triangular wave signal reaches again a peak edge, and then the logic control circuit turns on the first high-side transistor in a sixth period until the triangular wave signal reaches again a bottom edge.

According to this embodiment, the first and the second high-side transistor and the first and the second low-side transistor constituting the H-bridge circuit are driven in a manner that the current through the secondary coil of the transformer is monitored and compared with the triangular wave signal. As a result, the on-off timing of each transistor can be adjusted by adjusting the shape of the triangular wave signal.

During a period, in the fifth period, from when the triangular wave signal reaches the error voltage until a first predetermined off-time elapses, the logic control unit may turn off the first high-side transistor; and after the first off-time has elapsed, the logic control unit may turn on the first high-side transistor.

If the first high-side transistor continues to be turned off in the fifth period, the current will flow through a body diode (parasitic diode) of the first high-side transistor. As a result, a voltage drop equivalent to a forward voltage Vf occurs, thereby causing a large power loss. Consequently, in the fifth period, the first high-side transistor is turned on after the first predetermined off-time has elapsed. As a result, the current, which was flowing through the body diode, is now delivered to the first high-side transistor, so that the power loss can be reduced. Also, if the first off-time is set appropriately, it is possible to prevent from turning on the first high-side transistor and the first low-side transistor simultaneously so as to prevent the through current.

During a period, in the second period, from when the triangular wave signal reaches the error voltage until a second predetermined off-time elapses, the logic control unit may turn off the second high-side transistor; and after the second off-time has elapsed, the logic control unit may turn on the second high-side transistor.

If the second high-side transistor continues to be turned off also in the second period, the current will flow through a body diode thereof and a large power loss results. Consequently, the second high-side transistor is switched to turn on after the second predetermined off-time has elapsed, so that the power loss can be reduced. Also, if the second off-time is set appropriately, it is possible to prevent from turning on the second high-side transistor and the second low-side transistor simultaneously so as to prevent the through current.

A transition time from a bottom edge of the triangular wave signal till a peak edge thereof may be set to a range of 2 to 100 times, more preferably, 5 to 15 times a transition time from a peak edge till a bottom edge. In such a case, a ratio of the dead time to the on-time (conducting time) and off time (non-conducting time) of the primary coil can be suitably set.

The logic control unit may control the on and off of the first and the second high-side transistor and the first and the second low-side transistor by inverting (by reversing) the peak edge and the bottom edge. The first and the second high-side transistor and the first and the second low-side transistor may each be constituted by a MOSFET.

The triangular wave signal generator, the error amplifier and the logic control unit may be integrated on a single semiconductor substrate. "Being integrated" includes a case where all of circuit components are formed on a semiconductor substrate and a case where the main components of a circuit are integrated thereon. Note that part of resistors or capacitors used to adjust circuit constants may be provided outside the semiconductor substrate. Integrating these circuit elements into a single LSI can reduce the circuit area.

Another embodiment of the present invention relates to a light emitting apparatus. This light emitting apparatus comprises: a fluorescent lamp; and an above-described inverter which supplies drive voltage to the fluorescent lamp. Two of the inverters may be provided at both ends of the fluorescent lamp, respectively, and may supply drive voltages of mutually reversed phases to the fluorescent lamp. The fluorescent lamp may be a cold cathode fluorescent lamp or an external electrode fluorescent lamp.

According to this embodiment, not only the efficiency of the inverter but also the luminance efficiency of the fluorescent lamp can be adjusted, so that the efficiency of the device as a whole can be improved.

Still another embodiment of the present invention relates to a liquid-crystal display. This liquid-crystal display comprises: a liquid-crystal panel; and a plurality of the above-described light emitting apparatuses arranged on a backside of the liquid-crystal panel.

2. An inverter according to another embodiment of the present invention comprises: a transformer; a first high-side transistor one end of which is connected to an input terminal where an input voltage is applied and the other end of which is connected to a first terminal of a primary coil of the transformer; a first low-side transistor one end of which is connected to a potential fixed terminal where a potential is fixed and the other end of which is connected to the first terminal of the primary coil; a second high-side transistor one end of which is connected to the input terminal and the other end of which is connected to a second terminal of the primary coil; a second low-side transistor one end of which is connected to the potential fixed terminal and the other end of which is connected to the second terminal of the primary coil; a pulse width modulator which monitors current through a secondary coil of the transformer and which adjusts a pulse-width-modulation signal by a feedback so that the current through the secondary coil is brought close to the a predetermined current value; and a logic control unit which controls on and off of the first and the second high-side transistor and the first and the second low-side transistor, based on the pulse-width-modulation signal generated by the pulse width modulator. The logic control unit including: a timing control unit which outputs a control signal specifying the on and off of the first and the second high-side transistor and the first and the second low-side transistor; a first comparator which compares a first switching voltage appearing at the first terminal of the primary coil with a first threshold voltage and which outputs a first comparison signal that goes to a predetermined level when the first switching voltage is higher than the first threshold voltage; and a predriver which controls the on and off of the first and the second high-side transistor and the first and the second low-side transistor, based on the control signal outputted from the timing control unit and the first comparison signal outputted from the first comparator. The predriver takes a logical sum of the control signal outputted from the timing control unit and the first comparison signal outputted from the first comparator, and turns on the first high-side transistor when on is specified to the first high-side transistor and the first comparison signal goes to the predetermined level.

When the first low-side transistor turns off, the first switching voltage rises precipitously to the vicinity of the input voltage from the vicinity of ground potential. Thus, the first switching voltage is monitored; and after it becomes higher than the first predetermined threshold voltage, on is specified to the first high-side transistor. This makes it possible to prevent the simultaneous turning-on of the first high-side transistor and the first low-side transistor so as to prevent the occurrence of the through current.

When the timing control unit outputs a control signal specifying off to the first low-side transistor and then a first predetermined off-time has elapsed, the timing control unit may output a control signal specifying on to the first high-side transistor.

The logic control unit may further include a second comparator which compares a second switching voltage appearing at the second terminal of the primary coil with a second threshold voltage and which outputs a second comparison signal that goes to a predetermined level when the second switching voltage is higher than the second threshold voltage. When the timing control unit outputs a control signal specifying off to the second low-side transistor and then a second predetermined off-time has elapsed, the timing control unit may output a control signal specifying on to the second high-side transistor; and when on of the second high-side transistor is specified and the second comparison signal goes to the predetermined level, the predriver may turn on the second high-side transistor.

When the second low-side transistor turns off, the second switching voltage rises precipitously to the vicinity of the input voltage from the vicinity of ground potential. Thus, the second switching voltage is monitored; and after it becomes higher than the second predetermined threshold voltage, on is specified to the second high-side transistor. This makes it possible to prevent the simultaneous turning-on of the second high-side transistor and the second low-side transistor so as to prevent the occurrence of the through current.

When the timing control unit outputs a control signal specifying off to the second low-side transistor and then a second predetermined off-time has elapsed, the timing control unit may output a control signal specifying on to the second high-side transistor.

The pulse width modulator may include: an error amplifier which outputs an error voltage according to a difference between a detection voltage according to a current through the secondary coil of the transformer and a predetermined reference voltage; a triangular wave signal generator which generates a triangular wave signal; and a pulse-width modulation comparator which compares the triangular wave signal with the error voltage and outputs the pulse-width-modulation signal. The timing control unit may output a control signal repeatedly specifying on to: the first high-side transistor and the second low-side transistor in a period during which the triangular wave signal starts from a bottom edge thereof until it reaches the error voltage, then the first high-side transistor in a period until the second off-time has elapses, then the first and the second high-side transistor in a period until the triangular wave signal reaches a peak edge, then the second high-side transistor in a period until the triangular wave signal reaches a bottom edge, then the first low-side transistor and the second high-side transistor in a period until the triangular wave signal reaches again the error voltage, then the second high-side transistor in a period until the first off-time has elapsed, then the first and the second high-side transistor in a period until the triangular wave signal reaches again a peak edge, and then the first high-side transistor in a period until the triangular wave signal reaches again a bottom edge.

A transition time from a bottom edge of the triangular wave signal till a peak edge thereof may be set to a range of 2 to 100 times, more preferably, 5 to 15 times a transition time from a peak edge till a bottom edge. In such a case, a ratio of the dead time to the on-time and off time of the primary coil can be suitably set.

The timing control unit in the logic control unit may output the control signal by inverting the peak edge and the bottom edge. The first and the second high-side transistor and the first and the second low-side transistor may each be constituted by a MOSFET.

The pulse width modulator and the logic control unit may be integrated on a single semiconductor substrate. Integrating these circuits into a single LSI can reduce the circuit area.

Another embodiment of the present invention relates to a light emitting apparatus. This light emitting apparatus comprises: a fluorescent lamp; and an above-described inverter which supplies drive voltage to the fluorescent lamp. Two of the inverters may be provided at both ends of the fluorescent lamp, respectively, and may supply drive voltages of mutually reversed phases to the fluorescent lamp. The fluorescent lamp may be a cold cathode fluorescent lamp or an external electrode fluorescent lamp.

Still another embodiment of the present invention relates to a liquid-crystal display. This liquid-crystal display comprises: a liquid-crystal panel; and a plurality of the above-described light emitting apparatuses arranged on a backside of the liquid-crystal panel.

The occurrence of the through current is suppressed in the above-described inverter. Thus the reliability of the light emitting apparatus and the liquid-crystal display can be improved.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 5A to 5H are timing charts showing operating states of an inverter shown in FIG. 1.

FIGS. 7A to 7E are timing charts showing operating states of an inverter according to a modification.

FIGS. 10A to 10I are timing charts showing operating states of an inverter.

FIGS. 12A to 12E are timing charts of an inverter of FIG. 8 in a case when delay time is short.

FIGS. 13A to 13E are timing charts of an inverter of FIG. 8 in a case when delay time is long.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

First Embodiment

Figure 1:
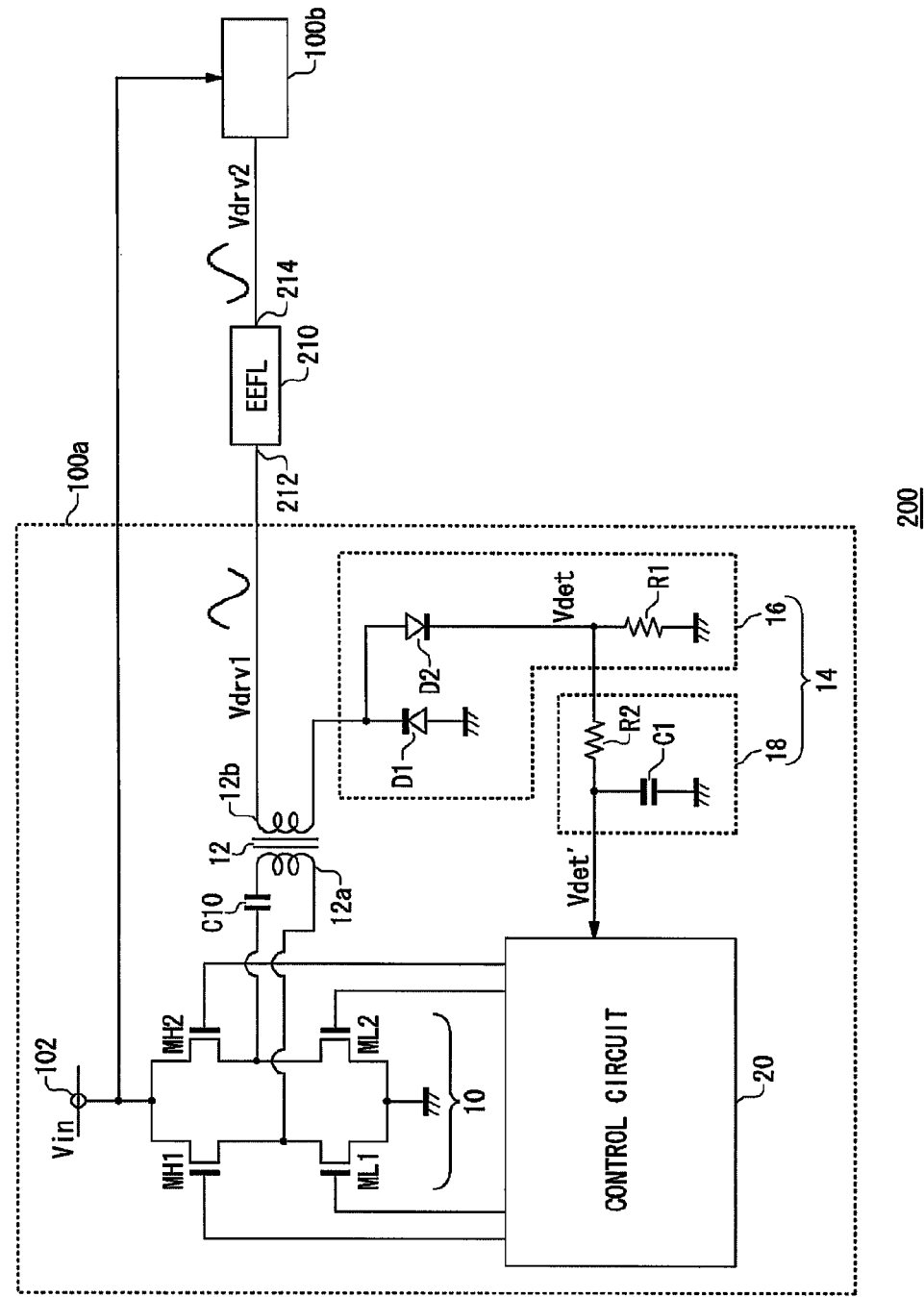
FIG. 1 is a circuit diagram showing a structure of a light emitting apparatus according to a first embodiment.
Figure 2:
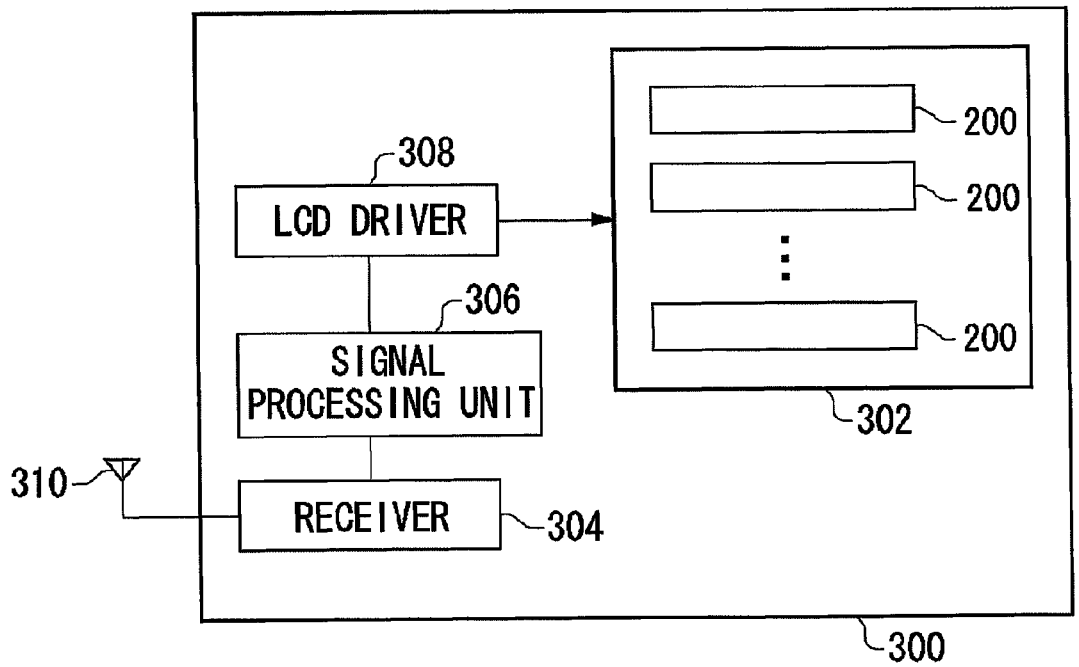
FIG. 2 is a block diagram showing a structure of an LCD on which light emitting apparatuses of FIGS. 1 and 8 are mounted.

In a first embodiment, a description is given of an inverter capable of flexibly setting the timing of switching on and off switching transistors of the inverter using an H-bridge circuit and a control circuit for the inverter. FIG. 1 is a circuit diagram showing a structure of a light emitting apparatus 200 according to an embodiment of the present invention. FIG. 2 is a block diagram showing a structure of an LCD 300 on which the light emitting apparatus 200 of FIG. 1 are mounted. The LCD 300 is connected to an antenna 310. The antenna 310 receives broadcast waves and outputs received signals to a receiver 304. The receiver 304 detects and amplifies the received signals so as to be outputted to a signal processing unit 306. The signal processing unit 306 outputs image data, acquired by demodulating the modulated data, to an LCD driver 308. The LCD driver 308 outputs the image data to an LCD panel 302 for each scanning line so as to display videos and images. On the backside of the LCD panel 302, a plurality of light emitting apparatuses 200 are arranged as backlight. The light emitting apparatuses 200 according to the present embodiment can be suitably used as the backlight for such an LCD panel 302. Hereinbelow, referring back to FIG. 1, a detailed description will be given of a structure and an operation of the light emitting apparatus 200.

The light emitting apparatus 200 according to the present embodiment includes an EEFL 210, a first inverter 100a, and a second inverter 100b. The EEFL 210 is placed on the back surface of the LCD panel 302. The first inverter 100a and the second inverter 100b, which are each a DC/AC converter, convert an input voltage Vin outputted from a DC power supply into AC voltage and boost it so as to supply a first drive voltage Vdrv1 and a second drive voltage Vdrv2 to a first terminal 212 and a second terminal 214 of the EEFL 210, respectively. The first drive voltage Vdrv1 and the second drive voltage Vdrv2 are AC voltages having mutually reversed phases.

Though there is provided a single EEFL 210 in FIG. 1, a plurality of EEFLs may be arranged in parallel with one another. A description is given hereunder of a structure of the first inverter 100a and the second inverter 100b according to the present embodiment. The first inverter 100a and the second inverter 100b have a similar structure to each other. Thus no distinction will be made therebetween and they will be generically referred to as "inverter 100" in the following description.

The inverter 100 includes an H-bridge circuit 10, a transformer 12, a current-voltage converter 14, a control circuit 20, and a capacitor C10.

The H-bridge circuit 10 includes four power transistors which are a first high-side transistor MH1, a first low-side transistor ML1, a second high-side transistor MH2 and a second low-side transistor ML2.

One end of the first high-side transistor MH1 is connected to an input terminal 102 to which an input voltage is applied, whereas the other end thereof is connected to a first terminal of a primary coil 12a of the transformer 12. One end of the first low-side transistor ML1 is connected to a ground terminal where the potential thereof is fixed, whereas the other end thereof is connected to the first terminal of the primary coil 12a. One end of the second high-side transistor MH2 is connected to the input terminal 102, whereas the other end thereof is connected to a second terminal of the primary coil 12a via the DC-blocking capacitor C10. One end of the second low-side transistor ML2 is connected to the ground terminal, whereas the other end thereof is connected to the second terminal of the primary coil 12a via the DC-blocking capacitor C10.

The current-voltage converter 14 is provided between a secondary coil 12b of the transformer 12 and ground. The current-voltage converter 14 converts the current flowing through the secondary coil 12b, namely the current flowing through the EEFL 210, into a voltage so as to output it as a detection voltage Vdet'. The current-voltage converter 14 includes a rectifier circuit 16 and a filter 18.

The rectifier circuit 16 includes a first diode D1, a second diode D2, and a resistor R1. An anode of the first diode D1 is grounded, whereas a cathode thereof is connected to one end of the secondary coil 12b. An anode of the second diode D2 is connected with the cathode of the first diode D1. The resistor R1 is provided between a cathode of the second diode D2 and ground. The AC current flowing through the secondary coil 12b is half-wave rectified by the first diode D1 and the second diode D2 so as to flow through the resistor R1. A voltage drop which is proportional to the current flowing through the secondary coil 12b occurs across the resistor R1. The rectifier circuit 16 outputs the voltage drop across the resistor R1 as a detection voltage Vdet.

The filter 18 is a low-pass filer that includes a resistor R2 and a capacitor C1. The filter 18 feeds back the detection voltage Vdet', where high-frequency components have been removed, to the control circuit 20.

Based on the fed-back detection voltage Vdet', the control circuit 20 controls the on and off of the first high-side transistor MH1, the first low-side transistor ML1, the second high-side transistor MH2 and the second low-side transistor ML2 in the H-bridge circuit 10. A switching voltage is supplied to the primary coil 12a of the transformer 12 by the control performed by the H-bridge circuit 10. As a result, energy is converted in the transformer 12 so as to supply the first drive voltage Vdrv1 to the EEFL 210 connected with the secondary coil 12b.

Figure 3:
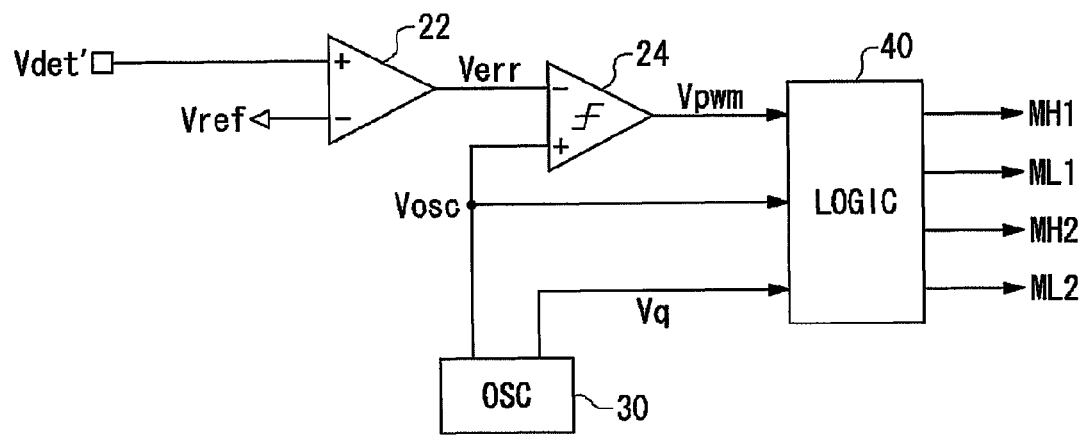
FIG. 3 is a circuit diagram showing a structure of a control circuit according to a first embodiment.

A structure of the control circuit 20 is described as follows. FIG. 3 is a circuit diagram showing a structure of the control circuit 20 according to the first embodiment. The control circuit 20, which includes an error amplifier 22, a PWM comparator 24, a triangular wave signal generator 30 and a logic control unit 40, is a function IC integrated on a single semiconductor substrate.

The detection voltage Vdet' which has been fed back from the current-voltage converter 14 is inputted to a noninverting input terminal of the error amplifier 22, whereas a predetermined reference voltage Vref is inputted to an inverting input terminal thereof. The reference voltage Vref is determined according to the light emission luminance of the EEFL 210. The error amplifier 22 outputs an error voltage Verr according to error between the detection voltage Vdet' and the reference voltage Vref.

Figure 4:
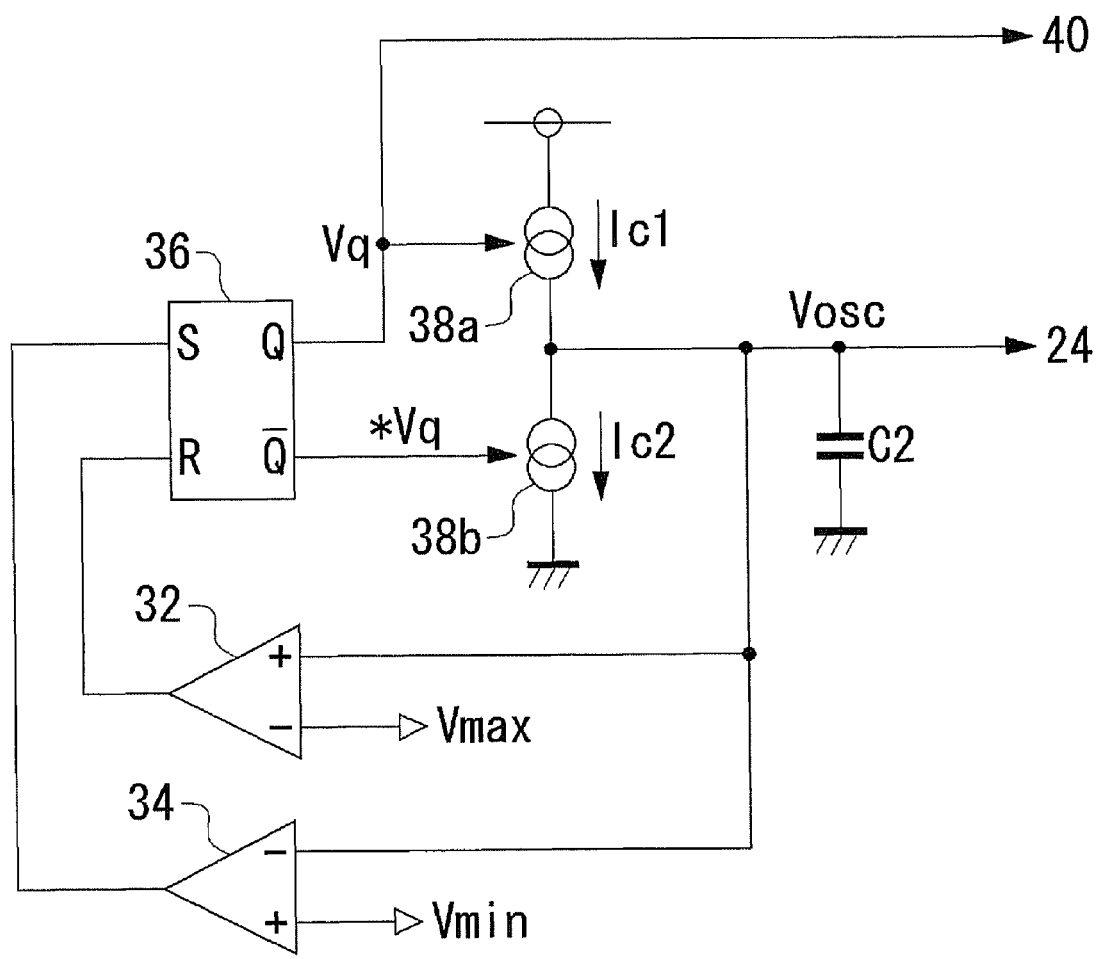
FIG. 4 is a circuit diagram showing an exemplary structure of a triangular wave signal generator.

A triangular wave signal generator 30 generates a triangular wave signal Vosc of a triangular wave shape having a predetermined frequency. FIG. 4 is a circuit diagram showing an exemplary structure of the triangular wave signal generator 30. The triangular wave signal generator 30 includes a first comparator 32, a second comparator 34, an RS flip-flop 36, a first constant-current source 38a, a second constant-current source 38b and a capacitor C2.

Since the triangular wave signal generator 30 has a general configuration, the structure and operation thereof will be briefly described here. The first constant-current source 38a is a current source for charging the capacitor C2 one end of which is grounded. The second constant-current source 38b is a current source for discharging the capacitor C2. A voltage appearing across the capacitor C2 is outputted as the triangular wave signal Vosc.

The first comparator 32 compares the potential of the triangular wave signal Vosc with a maximum voltage Vmax which is used to set a peak value of the triangular wave signal to be outputted. When Vosc>Vmax, the first comparator 32 outputs a high level. The second comparator 34 compares the potential of the triangular wave signal Vosc with a minimum voltage Vmin which is used to set a bottom value of the triangular wave signal to be outputted. When Vosc<Vmin, the second comparator 34 outputs a high level.

Output signals of the first comparator 32 and the second comparator 34 are inputted to a set terminal and a reset terminal of the RS flip-flop 36, respectively. An output signal Vq of the RS flip-flop 36 is outputted to the first constant-current source 38a, whereas an inverting output signal *Vq is outputted to the second constant-current source 38b. When the output signal Vq goes to a high level, the first constant-current source 38a turns on so as to charge the capacitor C2 with a constant current Ic1. When the inverting output signal *Vq goes to a high level, the second constant-current source 38b turns on so as to discharge the capacitor C2 with a constant current Ic2.

The triangular wave signal Vosc whose peak voltage and bottom voltage are set to Vmax and Vmin, respectively, is outputted from the triangular wave signal generator 30 structured as above. The output signal Vq of the RS flip-flop 36 is outputted to the logic control unit 40 as a periodic signal. Note that the triangular wave signal generator 30 may be structured by use of a hysteresis comparator.

Refer back to FIG. 3. The PWM comparator 24 compares the error voltage Verr outputted from the error amplifier 22 with the triangular wave signal Vosc outputted from the triangular wave signal generator 30. The PWM comparator 24 generates a pulse-width-modulation signal (hereinafter referred to as "PWM signal") that goes to a high level when Verr<Vosc and goes to a low level when Verr>Vosc. This PWM signal Vpwm together with the triangular wave signal Vosc and the periodic signal Vq is inputted to the logic control unit 40.

Based on the PWM signal Vpwm, the triangular wave signal Vosc and the periodic signal Vq, the logic control unit 40 controls the on and off of the first high-side transistor MH1, the first low-side transistor ML1, the second high-side transistor MH2 and the second low-side transistor ML2 of the H-bridge circuit 10. A description will be given hereunder of the logic control unit 40.

The logic control unit 40 controls the H-bridge circuit 10 in a manner that two cycles of the triangular wave signal Vosc generated by the triangular wave signal generator 30 are taken as one cycle. More specifically, the switching control is performed in a manner that two cycles of the triangular wave signal Vosc are divided into six periods composed of a first period to a sixth period. FIGS. 5A to 5H are timing charts showing operating states of the inverter 100. FIG. 5A shows the error voltage Verr and the triangular wave signal Vosc. FIG. 5B shows the PWM signal Vpwm. FIG. 5C shows the periodic signal Vq. FIGS. 5D to 5G show states of the first high-side transistor MH1, the second high-side transistor MH2, the first low-side transistor ML1 and the second low-side transistor ML2, respectively. FIG. 5H shows a potential Vsw at the first terminal of the primary coil 12a of the transformer 12. In FIGS. 5D to 5G, a high level indicates that a transistor is on, and a low level indicates that it is off. The vertical axis and the horizontal axis of the same Figures are enlarged or reduced as appropriate for the simplicity of explanation.

A description is first given of dividing into six periods composed of a first period $\phi 1$ to a sixth period $\phi 6$. In the logic control unit 40, a period during which the triangular wave signal Vosc starts from a bottom edge thereof until it reaches the error voltage Verr is denoted by the first period $\phi 1$. Then a period until the triangular wave signal Vosc reaches a peak edge is denoted by the second period $\phi 2$. Then a period until the triangular wave signal Vosc reaches a bottom edge is denoted by the third period $\phi 3$. Then a period until the triangular wave signal Vosc reaches again the error voltage Verr is denoted by the fourth period $\phi 4$. Then a period until the triangular wave signal Vosc reaches again a peak edge is denoted by the fifth period $\phi 5$. Then a period until the triangular wave signal Vosc reaches again a bottom edge is denoted by the sixth period $\phi 6$. This division can be constructed, by use of a commonly used logic circuit, based on the PWM signal Vpwm and the periodic signal Vq.

A description will next be given of an on-off state of the H-bridge circuit 10 during the first period $\phi 1$ through the sixth period $\phi 6$.

In the first period $\phi 1$, the logic control unit 40 turns on the first high-side transistor MH1 and the second low-side transistor ML2, and turns off the other transistors. In the subsequent second period $\phi 2$, the logic control unit 40 turns on the first high-side transistor MH1 and turns off the other transistors. In the subsequent third period $\phi 3$, it turns on the second high-side transistor MH2 and turns off the other transistors. In the subsequent fourth period $\phi 4$, it turns on the first low-side transistor ML1 and the second high-side transistor MH2, and turns off the other transistors. In the subsequent fifth period $\phi 5$, it turns on the second high-side transistor MH2 and turns off the other transistors. In the subsequent sixth period $\phi 6$, it turns on the first high-side transistor MH1 and turns off the other transistors. Then the period returns to a first period $\phi 1$.

A description is now given of an operation of the inverter 100, according to the present embodiment, structured as above. FIGS. 6A to 6F are circuit diagrams showing the flow of electric current in the H-bridge circuit 10. FIG. 6A to FIG. 6F illustrate on-off states of transistors and states of coil current Isw in the first period $\phi 1$ to the sixth period $\phi 6$, respectively.

Figure 6A:
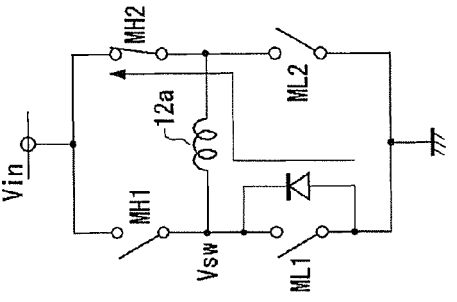
FIGS. 6A to 6F are circuit diagrams showing the flow of electric current in an H-bridge circuit in an inverter of FIG. 1.

As shown in FIG. 6A, the first high-side transistor MH1 and the second low-side transistor ML2 turn on in the first period $\phi 1$. As a result, the coil current Isw flows through a path which includes the first high-side transistor MH1, the primary coil 12a and the second low-side transistor ML2. At this time, the switching voltage Vsw is nearly equal to the input voltage Vin. In the first period $\phi 1$, the coil current Isw increases gradually.

Figure 6B:
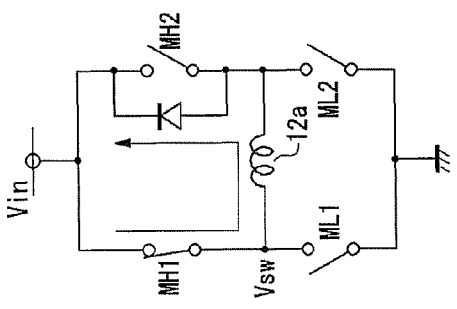

As shown in FIG. 6B, the second low-side transistor ML2 is turned off and the first high-side transistor MH1 only turns on in the subsequent second period $\phi 2$. As a result, by the energy stored in the primary coil 12a a regenerative current flows through a body diode of the second high-side transistor MH2. During this time, the switching voltage Vsw retains the voltage which is nearly equal to the input voltage.

Figure 6C:
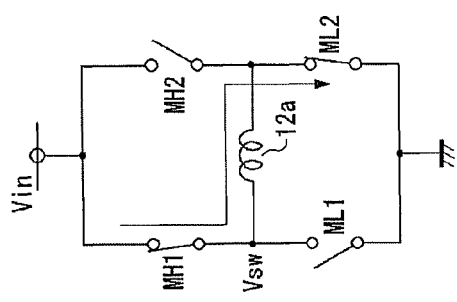

Next, as shown in FIG. 6C, the second high-side transistor MH2 is switched to turn on and the first high-side transistor MH1 is turned off in the third period $\phi 3$. At this time, the coil current Isw, which was being supplied from the first high-side transistor MH1 in the second period $\phi 2$, is now supplied from ground via a body diode of the first low-side transistor ML1. The switching voltage Vsw in the third period $\phi 3$ becomes a negative value which is lower than the ground potential (0 V) by a forward voltage Vf across the body diode of the first low-side transistor ML1. The energy stored in the primary coil 12a in the first period $\phi 1$ is all transferred to the secondary coil 12b in the third period $\phi 3$, so that the coil current Isw becomes "0".

Figure 6D:
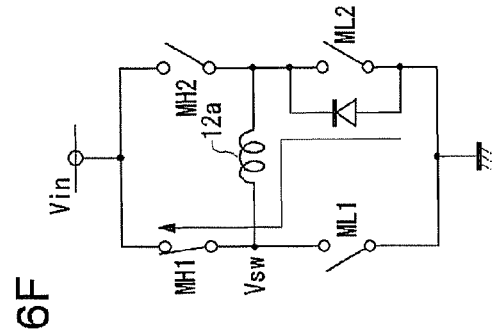

As shown in FIG. 6D, in the subsequent fourth period $\phi 4$, the first low-side transistor ML1 is switched to turn on while the second high-side transistor MH2 maintains the on state. At this time, the switching voltage Vsw is fixed to a neighborhood of the ground potential. The coil current Isw flows from right to left in a path which includes the second high-side transistor MH2, the primary coil 12a and the first low-side transistor ML1. In the fourth period φ4, the coil current Isw increases gradually.

Figure 6E:
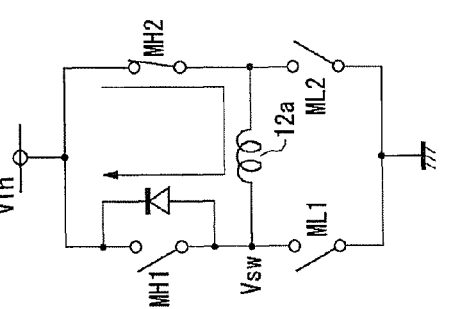

As shown in FIG. 6E, in the subsequent fifth period φ5, the first low-side transistor ML1 is switched to turn off while the second high-side transistor MH2 maintains the on state. As a result, the coil current Isw, which was flowing through the first low-side transistor ML1 in the fourth period φ4, now flows through a body diode of the first high-side transistor MH1. At this time, the switching voltage Vsw becomes higher than the input voltage Vin by the forward voltage Vf across the body diode thereof.

Figure 6F:
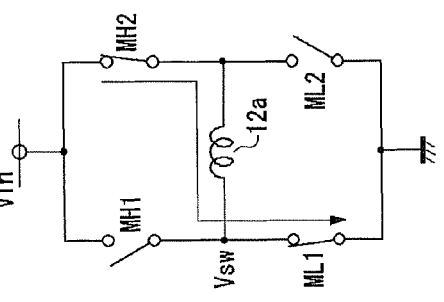

As shown in FIG. 6F, in the subsequent sixth period φ6, the first high-side transistor MH1 is switched to turn on and the second high-side transistor MH2 is turned off. At this time, the coil current Isw, which was being supplied from the second high-side transistor MH2 in the fifth period φ5, is now supplied from ground via a body diode of the second low-side transistor ML2. The switching voltage Vsw in the sixth period φ6 becomes nearly equal to the input voltage Vin. The energy stored in the primary coil 12a in the fourth period φ4 is all transferred to the secondary coil 12b in the sixth period φ6, so that the coil current Isw becomes "0".

According to the inverter 100 of the present embodiment, the transistors constituting the H-bridge circuit 10 are driven in a manner that the current flowing through the secondary coil 12b of the transformer 12 is monitored and compared with the triangular wave signal Vosc. Thus, the on-off timing of each transistor can be flexibly adjusted by adjusting the shape of the triangular wave signal Vosc.

For example, in the present embodiment, the length of the first period φ1 and the fourth period φ4 depends on a slope at which the triangular wave signal Vosc transits from a bottom edge to a peak edge. In the triangular wave signal generator 30 shown in FIG. 4, this slope can be varied by adjusting the constant current Ic1.

Also, in the present embodiment, the transition period from a peak edge to a bottom edge of the triangular wave signal Vosc is set to the third period φ3 and the sixth period φ6. The length of the third period φ3 and the sixth period φ6 can be varied by adjusting the constant current Ic2 in the triangular wave signal generator 30 of FIG. 4.

Here, the energy stored in the primary coil 12a depends on the length of the first period φ1 and the fourth period φ4. The energy stored during the first period φ1 and the fourth period φ4 is transferred to the secondary coil 12b in the third period φ3 and the sixth period φ6. Thus, the circuit can be driven highly efficiently by adjusting the shape or cycle of the triangular wave signal Vosc according to the characteristics of the transformer 12 or those of EEFL 210 to be driven.

It is desired that the transition time from a bottom edge of the triangular wave signal Vosc till a peak edge thereof be set to a range of 2 to 100 times, more preferably, 5 to 15 times the transition time from a peak edge till a bottom edge. To which value the transition time is to be set may be determined according to the frequency of a triangular wave, the characteristics of a transformer and so forth. Designing the triangular wave signal Vosc in this range makes it possible to perform a highly efficient drive.

The above-described embodiments are merely exemplary, and it is understood by those skilled in the art that various modifications to the combination of each component and process thereof are possible and such modifications are also within the scope of the present invention.

As a control of the H-bridge circuit 10 by the logic control unit 40, the following modifications are conceivable, for example.

According to this modification, in the fifth period φ5 the logic control unit 40 turns off the first high-side transistor MH1 during a period from when the triangular wave signal Vosc reaches the error voltage Verr until when a first predetermined off-time Toff1 elapses. After the first off-time Toff1 has elapsed, it turns on the first high-side transistor MH1.

Further, in the second period φ2, too, the logic control unit 40 turns off the second high-side transistor MH2 during a period from when the triangular wave signal Vosc reaches the error voltage Verr until when a second predetermined off-time Toff2 elapses. After the second off-time Toff2 has elapsed, it turns on the second high-side transistor MH2. The first off-time Toff1 and the second off-time Toff2 may be set to a range of about 50 ns to about 200 ns according to the cycle of the triangular wave signal Vosc.

FIGS. 7A to 7E are timing charts showing operating states of an inverter 100 according to a modification. FIG. 7A shows an on-off state of the first high-side transistor MH1; FIG. 7B shows an on-off state of the second high-side transistor MH2; FIG. 7C shows an on-off state of the first low-side transistor ML1; FIG. 7D shows an on-off state of the second low-side transistor ML2; and FIG. 7 E shows the switching voltage Vsw.

If the second high-side transistor MH2 continues to be turned off in the fifth period φ5, the coil current Isw will flow through the body diode (parasitic diode) of the second high-side transistor MH2. As a result, a voltage drop equivalent to the forward voltage Vf occurs, thereby causing a large power loss. Consequently, according to the present modification, in the fifth period φ5, the first high-side transistor MH1 is turned on after the first predetermined off-time Toff1 has elapsed. As a result, as shown in FIG. 7E, the switching voltage Vsw drops to the input voltage Vin after the first off-time Toff1 has elapsed. At this time, the coil current Isw, which was flowing through the body diode of the first high-side transistor MH1, now flows through the first high-side transistor MH1, so that the power loss can be reduced. Also, if the first off-time Toff1 is set appropriately, it is possible to prevent the flow of a through current when the first high-side transistor MH1 and the first low-side transistor ML1 turn on simultaneously.

Similarly, if the second high-side transistor MH2 continues to be turned off in the second period φ2, the current will flow through the body diode thereof, thus causing a large power loss. In the light of this, the second high-side transistor MH2 is turned on after the second predetermined off-time Toff2 has elapsed, thereby causing the current to flow through the second high-side transistor MH2. This can reduce the power loss.

The first off-time Toff1 and the second off-time Toff2 may be determined according to the characteristics of the transformer 12. It is preferable that the first off-time Toff1 and the second off-time Toff2 be set in the range of about 30 ns to about 150 ns. More preferably, if they are set in the range of 50 ns to 100 ns, the power loss can be reduced.

In the present embodiment, the components constituting the control circuit 20 may all be integrated in a single package, or part of them may be comprised of discrete components or chip components. Also, the control circuit 20 may be integrated by including the H-bridge circuit 10. Which of the components is to be integrated may be determined in consideration of the specifications, the cost, the area to be occupied and the like of the inverter 100.

In the present embodiment, the high-level and low-level settings of logical values in a logic circuit are merely exemplary, and they can be changed freely by inverting them as appropriate by an inverter or the like. For example, the logic control unit 40 may control the on and off of the transistors in the H-bridge circuit 10 by inverting the peak edge and the bottom edge.

In the present embodiment, a description has been given of a case where the high-side transistors in transistors constituting the H-bridge circuit 10 are formed by N-channel MOSFETs. However, P-channel MOSFETs may be used instead.

In the present embodiment, a description has been given of a case where in the light emitting apparatus 200 the inverter 100 is connected to the both ends of the EEFL 210 which is driven by drive voltages of reversed phases. However, this should not be considered as limiting. Also, a fluorescent tube to be driven is not limited to the EEFL and may be other fluorescent tubes such as CCFL. Also, a load driven by the inverter 100 according to the present embodiment is not limited to the fluorescent tube and may be applied to the driving of other various devices that require AC high voltage.

Second Embodiment

In a second embodiment, a description will be given of a technology where the through current is prevented in an inverter that uses an H-bridge circuit.

Figure 8:
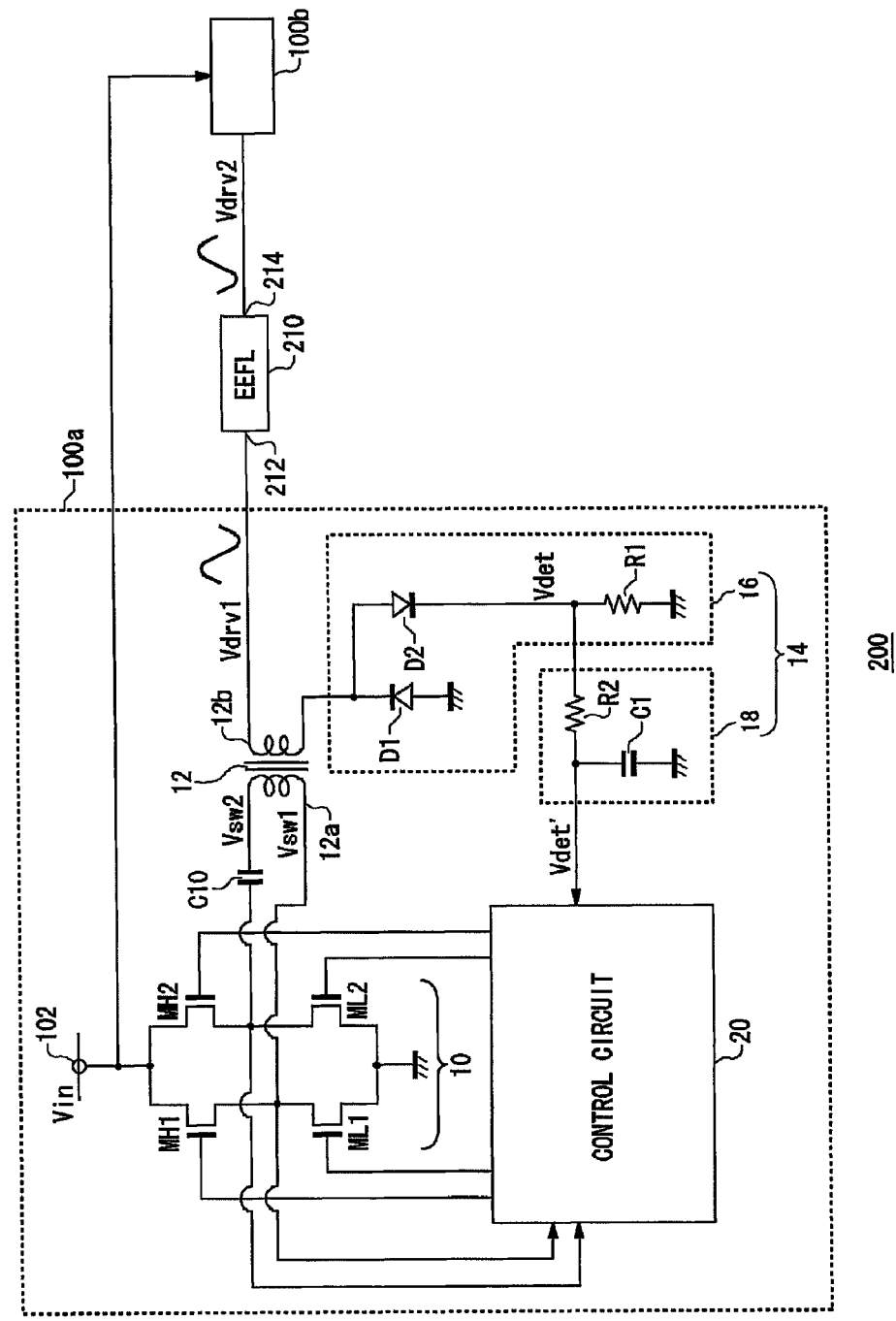
FIG. 8 is a circuit diagram showing a structure of a light emitting apparatus according to a second embodiment.

FIG. 8 is a circuit diagram showing a structure of a light emitting apparatus 200 according to a second embodiment of the present invention. Similar to the light emitting apparatus shown in FIG. 1, the light emitting apparatus 200 shown in FIG. 8 is mounted on the LCD 300 as shown in FIG. 2.

The light emitting apparatus 200 shown in FIG. 8 according to the second embodiment includes an EEFL 210, a first inverter 100a, and a second inverter 10b. The EEFL 210 is placed on the back surface of the LCD panel 302. The first inverter 100a and the second inverter 10b, which are each a DC/AC converter, convert an input voltage Vin outputted from a DC power supply into AC voltage and boost it so as to supply a first drive voltage Vdrv1 and a second drive voltage Vdrv2 to a first terminal 212 and a second terminal 214 of the EEFL 210, respectively. The first drive voltage Vdrv1 and the second drive voltage Vdrv2 are AC voltages having mutually reversed phases.

Though there is provided a single EEFL 210 in FIG. 8, a plurality of EEFLs may be arranged in parallel with one another. A description is given hereunder of a structure of the first inverter 100a and the second inverter 100b according to the present embodiment. The first inverter 100a and the second inverter 100b have a similar structure to each other. Thus no distinction will be made therebetween and they will be generically referred to as "inverter 100" in the following description.

The inverter 100 includes an H-bridge circuit 10, a transformer 12, a current-voltage converter 14, a control circuit 20, and a capacitor C10.

The H-bridge circuit 10 includes four power transistors which are a first high-side transistor MH1, a first low-side transistor ML1, a second high-side transistor MH2 and a second low-side transistor ML2.

One end of the first high-side transistor MH1 is connected to an input terminal 102 to which an input voltage is applied, whereas the other end thereof is connected to a first terminal of a primary coil 12a of the transformer 12. One end of the first low-side transistor ML1 is connected to a ground terminal where the potential thereof is fixed, whereas the other end thereof is connected to the first terminal of the primary coil 12a. One end of the second high-side transistor MH2 is connected to the input terminal 102, whereas the other end thereof is connected to a second terminal of the primary coil 12a via the DC-blocking capacitor C10. One end of the second low-side transistor ML2 is connected to the ground terminal, whereas the other end thereof is connected to the second terminal of the primary coil 12a via the DC-blocking capacitor C10.

Hereinafter, the voltage at the first terminal of the primary coil 12a of the transformer 12 will be called a first switching voltage Vsw1 and the voltage at the second terminal thereof will be called a second switching voltage Vsw2.

The current-voltage converter 14 is provided between a secondary coil 12b of the transformer 12 and ground. The current-voltage converter 14 converts the current flowing through the secondary coil 12b, namely the current flowing through the EEFL 210, into a voltage so as to output it as a detection voltage Vdet'. The current-voltage converter 14 includes a rectifier circuit 16 and a filter 18.

The rectifier circuit 16 includes a first diode D1, a second diode D2, and a resistor R1. An anode of the first diode D1 is grounded, whereas a cathode thereof is connected to one end of the secondary coil 12b. An anode of the second diode D2 is connected with the cathode of the first diode D1. The resistor R1 is provided between a cathode of the second diode D2 and ground. The AC current flowing through the secondary coil 12b is half-wave rectified by the first diode D1 and the second diode D2 so as to flow through the resistor R1. A voltage drop which is proportional to the current flowing through the secondary coil 12b occurs across the resistor R1. The rectifier circuit 16 outputs the voltage drop across the resistor R1 as a detection voltage Vdet.

The filter 18 is a low-pass filer that includes a resistor R2 and a capacitor C1. The filter 18 feeds back the detection voltage Vdet', where high-frequency components have been removed, to the control circuit 20.

Based on the fed-back detection voltage Vdet', the first switching voltage Vsw1 and the second switching voltage Vsw2, the control circuit 20 controls the on and off of the first high-side transistor MH1, the first low-side transistor ML1, the second high-side transistor MH2 and the second low-side transistor ML2 in the H-bridge circuit 10. A switching voltage is supplied to the primary coil 12a of the transformer 12 by the control performed by the H-bridge circuit 10. As a result, energy is converted in the transformer 12 and thereby the first drive voltage Vdrv1 is supplied to the EEFL 210 connected with the secondary coil 12b.

Figure 9:
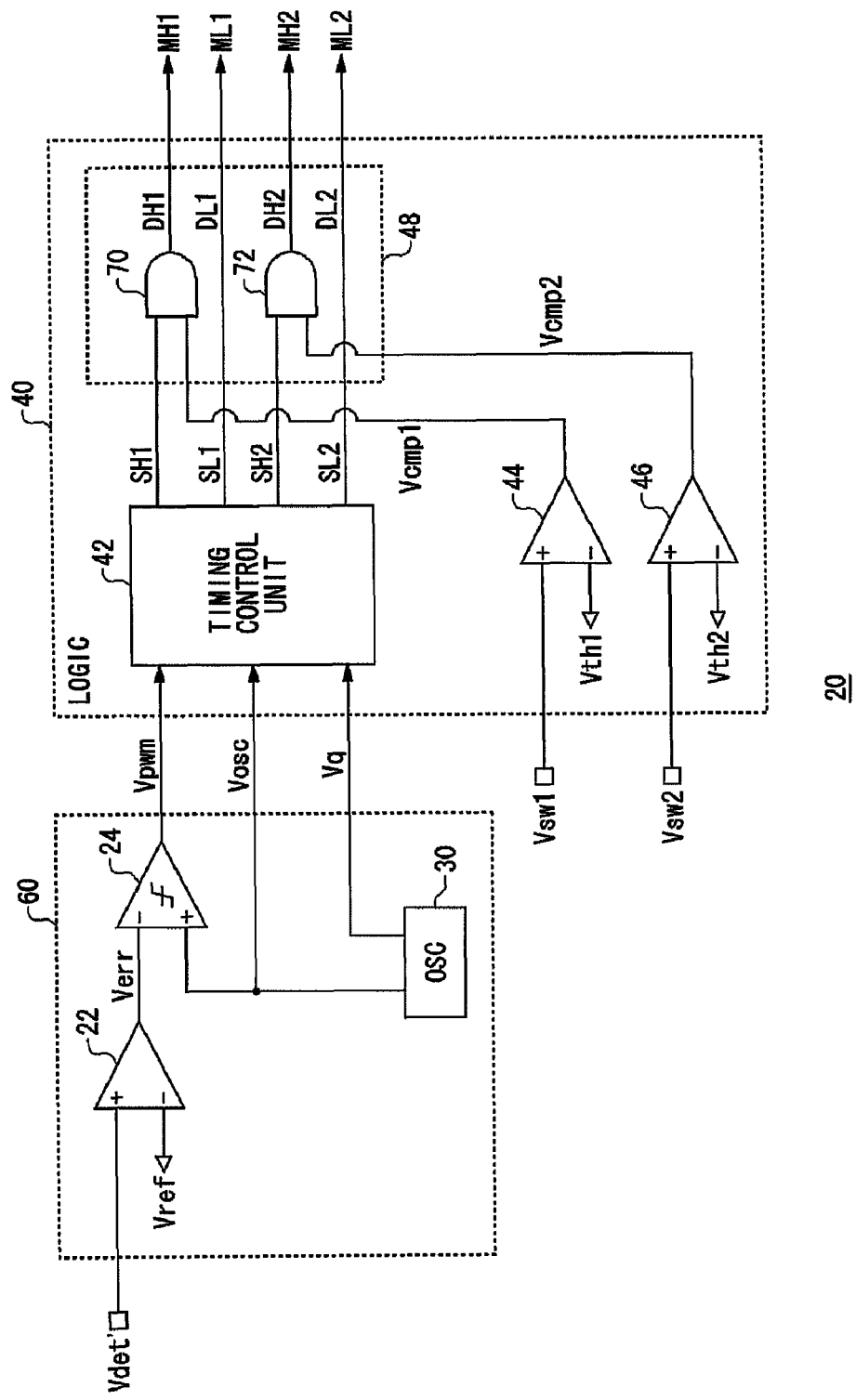
FIG. 9 is a circuit diagram showing a structure of a control circuit according to a second embodiment.

A structure of the control circuit 20 is described as follows. FIG. 9 is a circuit diagram showing a structure of the control circuit 20 according to the present embodiment. The control circuit 20, which includes a pulse width modulator 60 and a logic control unit 40, is a function IC integrated on a single semiconductor substrate.

The pulse width modulator 60 monitors the detection voltage Vdet', namely the current through the secondary coil 12b of the transformer 12, and generates a pulse-width-modulation signal (hereinafter referred to as "PWM signal Vpwm") whose pulse width is adjusted by feedback so that the current through the secondary coil is brought close to a predetermined current value.

Based on the PWM signal Vpwm generated by the pulse width modulator 60, the logic control unit 40 controls the on and off of the first high-side transistor MH1, the second high-side transistor MH2, the first low-side transistor ML1 and the second low-side transistor ML2.

The pulse width modulator 60 includes an error amplifier 22, a PWM comparator 24, and a triangular wave signal generator 30.

A detection voltage Vdet' which has been fed back from the current-voltage converter 14 is inputted to a noninverting input terminal of the error amplifier 22, whereas a predetermined reference voltage Vref is inputted to an inverting input terminal thereof. The reference voltage Vref is determined according to the light emission luminance of the EEFL 210. The error amplifier 22 outputs an error voltage Verr according to error between the detection voltage Vdet' and the reference voltage Vref.

The triangular wave signal generator 30 generates a triangular wave signal Vosc of a triangular wave shape having a predetermined frequency. FIG. 4 is a circuit diagram showing an exemplary structure of the triangular wave signal generator 30. The triangular wave signal generator 30 includes a comparator 32, a comparator 34, an RS flip-flop 36, a first constant-current source 38a, a second constant-current source 38b and a capacitor C2.

Since this triangular wave signal generator 30 has a general configuration, the structure and operation thereof will be briefly described here. The first constant-current source 38a is a current source for charging the capacitor C2 one end of which is grounded. The second constant-current source 38b is a current source for discharging the capacitor C2. A voltage appearing across the capacitor C2 is outputted as the triangular wave signal Vosc.

The comparator 32 compares the potential of the triangular wave signal Vosc with a maximum voltage Vmax which is used to set a peak value of the triangular wave signal to be outputted. When Vosc>Vmax, the comparator 32 outputs a high level. The comparator 34 compares the potential of the triangular wave signal Vosc with a minimum voltage Vmin which is used to set a bottom value of the triangular wave signal to be outputted. When Vosc<Vmin, the comparator 34 outputs a high level.

Output signals of the comparator 32 and the comparator 34 are inputted to a set terminal and a reset terminal of the RS flip-flop 36, respectively. An output signal Vq of the RS flip-flop 36 is outputted to the first constant-current source 38a, whereas an inverting output signal *Vq is outputted to the second constant-current source 38b. When the output signal Vq goes to a high level, the first constant-current source 38a turns on so as to charge the capacitor C2 with a constant current Ic1. When the inverting output signal *Vq goes to a high level, the second constant-current source 38b turns on so as to discharge the capacitor C2 with a constant current Ic2.

The triangular wave signal Vosc whose peak voltage and bottom voltage are set to Vmax and Vmin, respectively, are outputted from the triangular wave signal generator 30 structured as above. The output signal Vq of the RS flip-flop 36 is outputted to the logic control unit 40 as a periodic signal. Note that the triangular wave signal generator 30 may be structured by use of a hysteresis comparator.

Refer back to FIG. 9. The PWM comparator 24 compares the error voltage Verr outputted from the error amplifier 22 with the triangular wave signal Vosc outputted from the triangular wave signal generator 30. The PWM comparator 24 generates a PWM signal Vpwm that goes to a high level when Verr<Vosc and goes to a low level when Verr>Vosc. This PWM signal Vpwm together with the triangular wave signal Vosc and the periodic signal Vq is inputted to the logic control unit 40.

Based on the PWM signal Vpwm, the triangular wave signal Vosc and the periodic signal Vq, the logic control unit 40 controls the on and off of the first high-side transistor MH1, the first low-side transistor ML1, the second high-side transistor MH2 and the second low-side transistor ML2 of the H-bridge circuit 10. A description will be given hereunder of the logic control unit 40.

The logic control unit 40 includes a timing control unit 42, a first comparator 44, a second comparator 46, and predriver 48.

The timing control unit 42 outputs control signals SH1, SH2, SL1 and SL2 that specify the on and off of the first high-side transistor MH1, the second high-side transistor MH2, the first low-side transistor ML1, and the second low-side transistor ML2, respectively.

The first comparator 44 compares a first switching voltage Vsw1 appearing at the first terminal of the primary coil 12a of the transformer 12 with a first predetermined threshold voltage Vth1. The first comparator 44 outputs a first comparison signal Vcmp1 that goes to a high level when the first switching voltage Vsw1 is higher than the first threshold voltage Vth1.

The second comparator 46 compares a second switching voltage Vsw2 appearing at the second terminal of the primary coil 12a of the transformer 12 with a second predetermined threshold voltage Vth2. The second comparator 46 outputs a second comparison signal Vcmp2 that goes to a high level when the second switching voltage Vsw2 is higher than the second threshold voltage Vth2.

The predriver 48 controls the on and off of each transistor of the H-bridge circuit 10, based on the control signals SH1, SH2, SL1 and SL2 outputted from the timing control unit 42, and the first comparison signal Vcmp1 outputted from the first comparator 44 and the second comparison signal Vcmp2 outputted from the second comparator 46.

The predriver 48 includes AND gates 70 and 72, and outputs drive signals DH1, DH2, DL1 and DL2 to gates of the transistors in the H-bridge circuit 10, respectively. The AND gate 70 outputs the logical product of the control signal SH1 and the first comparison signal Vcmp1 as the drive signal DH1. The AND gate 72 outputs the logical product of the control signal SH2 and the second comparison signal Vcmp2 as the drive signal DH2. Note that the logical value of the drive signal DL1 is the same as the control signal SL1 whereas the logical value of the drive signal DL2 is the same as the control signal SL2. The drive signals DH1, DH2, DL1 and DL2 are amplified by an unshown buffer as necessary and then outputted to the H-bridge circuit 10.

Next a description is given of the generation of the control signals SH1, SH2, SL1 and SL2 in the timing control unit 42. The timing control unit 42 generates a control signal for controlling the H-bridge circuit 10 in a manner that two cycles of the triangular wave signal Vosc generated by the triangular wave signal generator 30 are taken as one cycle. More specifically, the switching control is performed in a manner that two cycles of the triangular wave signal Vosc are divided into eight periods composed of a first period φ1 to an eighth period φ8.

FIGS. 10A to 10I are timing charts showing operating states of the inverter 100. FIG. 10A shows an error voltage Verr and a triangular wave signal Vosc. FIG. 10B shows the PWM signal Vpwm. FIG. 10C shows the periodic signal Vq. FIGS. 10D to 10G show the control signals SH1, SH2, SL1 and SL2, respectively. FIGS. 10H and 10I show the first switching voltage Vsw1 and the second switching voltage Vsw2, respectively.

In FIGS. 10D to 10G, a high level of the control signals SH1, SH2, SL1 and SL2 corresponds to a state where a transistor is on, whereas a low level of them corresponds to a state where it is off. The vertical axis and the horizontal axis of the same Figures are enlarged or reduced as appropriate for the simplicity of explanation.

A description is first given of division into eight periods composed of a first period φ1 to an eighth period φ8. In the logic control unit 40, a period during which the triangular wave signal Vosc starts from a bottom edge thereof until it reaches the error voltage Verr is denoted by the first period φ1. Then a period until the second off-time Toff2 elapses is denoted by the second period φ2. Then a period until the triangular wave signal Vosc reaches a peak edge is denoted by the third period φ3. Then a period until the triangular wave signal Vosc reaches a bottom edge is denoted by the fourth period φ4. Then a period until the triangular wave signal Vosc reaches again the error voltage Verr is denoted by the fifth period φ5. Then a period until the second off-time Toff1 elapses is denoted by the sixth period φ6. Then a period until the triangular wave signal Vosc reaches again a peak edge is denoted by the seventh period φ7. Then a period until the triangular wave signal Vosc reaches again a bottom edge is denoted by the eighth period φ8.

The above division into the respective periods can be constructed, by use of a commonly used logic circuit, based on the PWM signal Vpwm, the periodic signal Vq, the first off-time Toff1 and the second off-time Toff2. The first off-time Toff1 and the second off-time Toff2 may be set to about 50 ns to about 200 ns according to the cycle of the triangular wave signal Vosc. A description will next be given of the on-off control of the transistors MH1, MH2, ML1 and ML2 during the first period φ1 through the eighth period φ8.

In the first period φ1, ON is specified to the first high-side transistor MH1 and the second low-side transistor ML2. In the subsequent second period φ2, ON is specified to the first high-side transistor MH1. In the subsequent third period φ3, ON is specified to the first high-side transistor MH1 and the second high-side transistor MH2. In the subsequent fourth period φ4, ON is specified to the second high-side transistor MH2. In the subsequent fifth period φ5, ON is specified to the first low-side transistor ML1 and the second high-side transistor MH2. In the subsequent sixth period φ6, ON is specified to the second high-side transistor MH2. In the subsequent seventh period φ7, ON is specified to the first high-side transistor MH1 and the second high-side transistor MH2. In the subsequent eighth period φ8, ON is specified to the first high-side transistor MH1. Then the period returns to a first period φ1. The control signals SH1, SH2, SL1 and SL2 shown in FIGS. 10D to 10G are generated according to the above control.

With the on-off operation of the transistors MH1, MH2, ML1 and ML2, the first switching voltage Vsw1 and the second switching voltage Vsw2 of reversed phases are applied to the first and the second terminal of the primary coil 12a of the transformer 12, respectively, as shown in FIGS. 10H and 10I. For easier understanding, the state of each transistor of the H-bridge circuit 10 is indicated as an ideal state in FIGS. 10A to 10I so that each transistor turns on and off without delay in response to the drive signal.

Figures 11A, 11B, 11C:
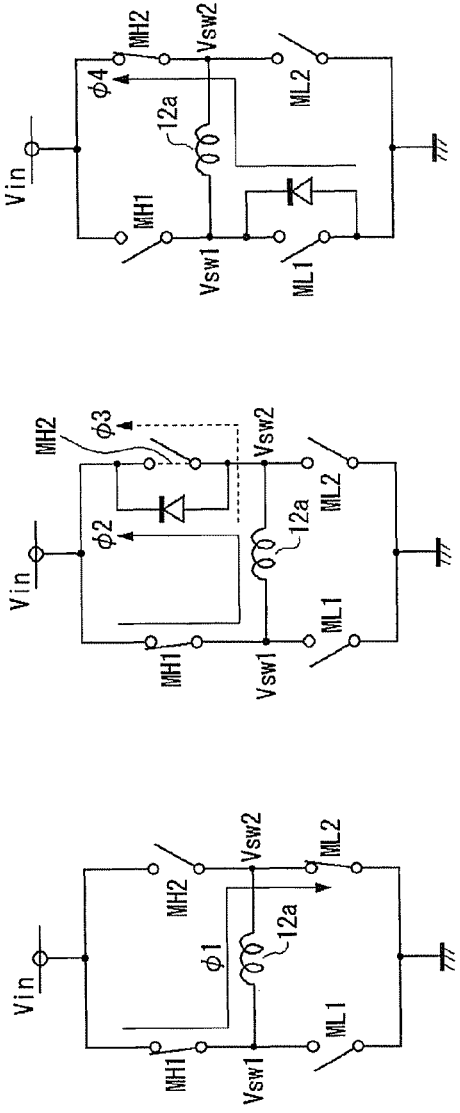
FIGS. 11A to 11F are circuit diagrams showing the flow of electric current in an H-bridge circuit in an inverter of FIG. 8.
Figures 11D, 11E, 11F:
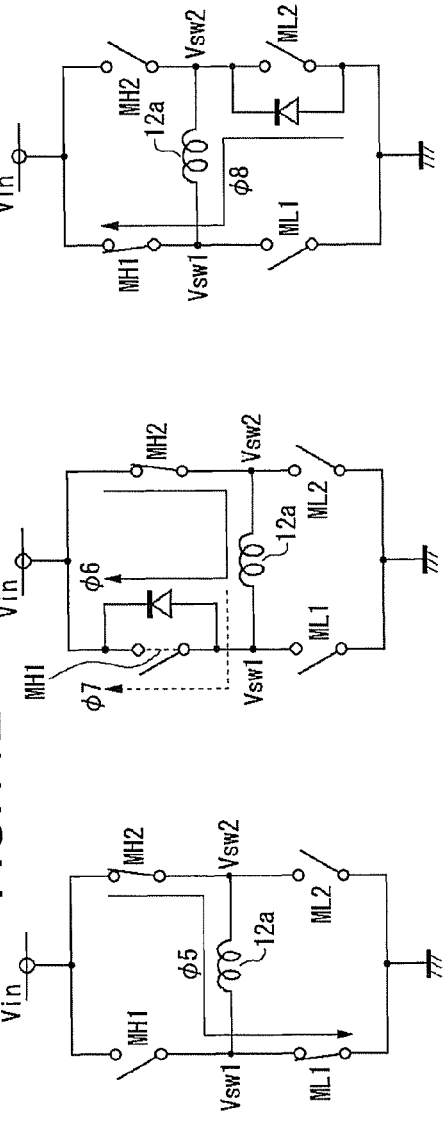

A description is now given of an operation of the inverter 100, according to the present embodiment, structured as above. FIGS. 11A to 11F are circuit diagrams showing the flow of electric current in the H-bridge circuit 10 according to the present embodiment. FIG. 11A illustrates an on-off state of each transistor and a state of coil current Isw in the first period φ1; FIG. 11B illustrates them in the second period φ2 and the third period φ3; FIG. 11C illustrates them in the fourth period φ4; FIG. 11D illustrates them in the fifth period φ5; FIG. 11E illustrates them in the sixth period φ6 and the seventh period φ7; and FIG. 11F illustrates them in the eighth period φ8.

As shown in FIG. 11A, the first high-side transistor MH1 and the second low-side transistor ML2 turn on in the first period φ1. As a result, the coil current Isw flows through a path which includes the first high-side transistor MH1, the primary coil 12a and the second low-side transistor ML2. At this time, a first switching voltage Vsw1 is nearly equal to the input voltage Vin. In the first period φ1, the coil current Isw increases gradually.

As shown by the solid line in FIG. 11B, the second low-side transistor ML2 is turned off and the first high-side transistor MH1 only turns on in the subsequent second period φ2. As a result, a regenerative current flows through a body diode of the second high-side transistor MH2 by the energy stored in the primary coil 12a. During this time, the switching voltage Vsw1 retains the voltage which is nearly equal to the input voltage. As shown by dotted lines in FIG. 11B, in the subsequent third period φ3, the second high-side transistor MH2 is turned on and the current path is switched from the body diode to the second high-side transistor MH2.

As shown in FIG. 11C, in the subsequent fourth period φ4, the second high-side transistor MH2 is switched to turn on and the first high-side transistor MH1 is turned off. At this time, the coil current Isw, which was being supplied from the first high-side transistor MH1 in the second period φ2, is now supplied from ground via a body diode of the first low-side transistor ML1. The first switching voltage Vsw1 in the third period φ3 becomes a negative value which is lower than the ground potential (0 V) by a forward voltage Vf across the body diode of the first low-side transistor ML1. The energy stored in the primary coil 12a in the first period φ1 is all transferred to the secondary coil 12b in the third period φ3, so that the coil current Isw becomes "0".

As shown in FIG. 1D, in the subsequent fifth period φ5, the first low-side transistor ML1 is switched to turn on while the second high-side transistor MH2 maintains the on state. At this time, the first switching voltage Vsw1 is fixed to a neighborhood of the ground potential. The coil current Isw flows from the second terminal toward the first terminal of the primary coil 12a in a path which includes the second high-side transistor MH2, the primary coil 12a and the first low-side transistor ML1. In the fifth period φ5, the coil current Isw increases gradually.

As shown by the solid line in FIG. 11E, in the subsequent sixth period φ6, the first low-side transistor ML1 is switched to turn off while the second high-side transistor MH2 maintains the on state. As a result, the coil current Isw, which was flowing through the first low-side transistor ML1 in the fifth period φ5, now flows through a body diode of the first high-side transistor MH1. At this time, the first switching voltage Vsw1 becomes higher than the input voltage Vin by the forward voltage Vf across the body diode thereof. In the subsequent seventh period φ7, as shown by dotted lines in FIG. 1E, the first high-side transistor MH1 is turned on and thereby the current path is switched from the body diode to the first high-side transistor MH1.

In the subsequent eighth period φ8, as shown in FIG. 11F, the first high-side transistor MH1 is switched to turn on and the second high-side transistor MH2 is turned off. At this time, the coil current Isw, which was being supplied from the second high-side transistor MH2 in the seventh period φ7, is now supplied from ground via a body diode of the second low-side transistor ML2. The first switching voltage Vsw1 in the eighth period φ8 becomes nearly equal to the input voltage Vin. The energy stored in the primary coil 12a in the fifth period φ5 is all transferred to the secondary coil 12b in the eighth period φ8, so that the coil current Isw becomes "0".

In FIGS. 10A to 10I, it is assumed that the transistors MH1, MH2, ML1 and ML2 turn on and off in response to the drive signals DH1, DH2, DL1 and DL2 without delay. However, in the actual setting, delay τ occurs due to the effect of the parasitic capacitance, such as gate capacitance, or parasitic resistance. When a delay time τ is larger than the first off-time Toff1, there is a possibility that the first high-side transistor MH1 turns on before the first low-side transistor ML1 turns off and thereby a through current flows through the two transistor paths. Referring to FIGS. 12A to 12E and FIGS. 13A to 13E, a description is hereinbelow given of a through current preventing mechanism in the inverter 100 according to the present embodiment.

Referring to FIGS. 12A to 12E, a description is first given of an operation in the case when the delay time τ is shorter than the first off-time Toff1. FIGS. 12A and 12B show the control signals SH1 and SL1; FIG. 12C shows the first switching voltage Vsw1; FIG. 12D shows the first comparison signal Vcmp1; and FIG. 12E shows the drive signal DH1.

At time to the control signal SL1 shown in FIG. 12B goes to a low level, and OFF is specified to the first low-side transistor ML1. Then, at time t1 when a delay time τ1 has elapsed, the first low-side transistor ML1 turns off. As the first low-side transistor ML1 turns off, the first switching voltage Vsw1 rises up to near a voltage (Vin+Vf) as shown in FIG. 12B. At time t1, the first comparison signal Vcmp1 goes to a high level, too.

At time t2 when the first off-time Toff1 has elapsed from time to, the control signal SH1 shown in FIG. 12A goes to a high level. Since the drive signal DH1 is a logical product of the first comparison signal Vcmp1 and the control signal SH1, the drive signal DH1 goes to a high level at time t1. As a result, ON is specified to the first high-side transistor MH1 at time t1. In the case of FIG. 12, the control signal SH1 and the drive signal DH1 are the same signal.

Referring to FIGS. 13A to 13E, a description is next given of an operation in the case when the delay time τ is longer than the first off-time Toff1. At time t0 the control signal SL1 shown in FIG. 13B goes to a low level, and OFF is specified to the first low-side transistor ML1. Then, at time t3 when a delay time τ2 has elapsed, the first low-side transistor ML1 turns off. As the first low-side transistor ML1 turns off, the first switching voltage Vsw1 rises. Thus, the first comparison signal Vcmp1 goes to a high level, too.

At time t2 when the first off-time Toff1 has elapsed from time t0, the control signal SH1 shown in FIG. 13A goes to a high level. Since the drive signal DH1 is a logical product of the first comparison signal Vcmp1 and the control signal SH1, the drive signal DH1 goes to a high level at time t3. As a result, ON is specified to the first high-side transistor MH1 at time t3.

A structure and an operation of the inverter 100 according to the present embodiment has been described as above. According to the inverter 100 of the present embodiment, the first switching voltage Vsw1 is monitored. And after the first switching voltage Vsw1 becomes higher than the first threshold voltage Vth1, that is, after the first low-side transistor ML1 turns off, ON is specified to the high-side transistor MH1. As a result, the simultaneous switching on of the first high-side transistor MH1 and the first low-side transistor ML1 can be prevented and thereby the occurrence of the through current can be prevented.

Similarly, the second switching voltage Vsw2 is monitored using the second comparator 46, so that the simultaneous switching on of the second high-side transistor MH2 and the first low-side transistor ML1 and the flowing of the through current can be prevented.

Also, according to the inverter 100 of the present embodiment, the transistors constituting the H-bridge circuit 10 are driven in a manner that the current flowing through the secondary coil 12b of the transformer 12 is monitored and compared with the triangular wave signal Vosc. Thus, the on-off timing of each transistor can be flexibly adjusted by adjusting the shape of the triangular wave signal Vosc.

For example, in the present embodiment, the length of the first period φ1 and the fifth period φ5 depends on a slope at which the triangular wave signal Vosc transits from a bottom edge to a peak edge. In the triangular wave signal generator 30 shown in FIG. 4, this slope can be varied by adjusting the constant current Ic1.

Also, in the present embodiment, the transition period from a peak edge to a bottom edge of the triangular signal Vosc is set to the fourth period φ4 and the eighth period φ8. The length of the fourth period φ4 and the eighth period φ8 can be varied by adjusting the constant current Ic2 in the triangular wave signal generator 30 of FIG. 4.

Here, the energy stored in the primary coil 12a depends on the length of the first period φ1 and the fifth period φ5. The energy stored during the first period φ1 and the fifth period φ5 is transferred to the secondary coil 12b in the fourth period φ4 and the eighth period φ8. Thus, the circuit can be driven highly efficiently by adjusting the shape or cycle of the triangular wave signal Vosc according to the characteristics of the transformer 12 or those of EEFL 210 to be driven.

It is desired that the transition time from a bottom edge of the triangular wave signal Vosc till a peak edge thereof be set to the range of 2 to 100 times, more preferably, 5 to 15 times the transition time from a peak edge till a bottom edge. To which value the transition time is to be set may be determined according to the frequency of a triangular wave, the characteristics of a transformer and so forth. Designing the triangular wave signal Vosc in this range makes it possible to perform a highly efficient drive.

If the second high-side transistor MH2 continues to be turned off after the first period φ1, the coil current Isw will flow through the body diode (parasitic diode) of the second high-side transistor MH2. As a result, a voltage drop equivalent to the forward voltage Vf occurs, thereby causing a large power loss. In the light of this, according to the present embodiment, after the second low-side transistor ML2 was turned off and the second off-time Toff2 has elapsed, the period transits to the third period φ3 and then the second high-side transistor MH2 is turned on.

As a result, as shown in FIG. 10H, the first switching voltage Vsw1 drops to the input voltage Vin after the first off-time Toff1 has elapsed. At this time, the coil current Isw, which was flowing through the body diode of the second high-side transistor MH2, now flows through the second high-side transistor MH2, so that the power loss can be reduced.

Similarly, if the first high-side transistor MH1 continues to be turned off in the sixth period φ6, the current will flow through the body diode thereof, thus causing a large power loss. In the light of this, the first high-side transistor MH1 is turned on after the second predetermined off-time Toff2 has elapsed, thereby causing the current to flow through the first high-side transistor MH1. This can reduce the power loss.

The above-described embodiments are merely exemplary, and it is understood by those skilled in the art that various modifications to the combination of each component and process thereof are possible and such modifications are also within the scope of the present invention.

In the present embodiment, the components constituting the control circuit 20 may all be integrated in a single package, or part of them may be comprised of discrete components or chip components. Also, the control circuit 20 may be integrated by including the H-bridge circuit 10. Which of the components is to be integrated may be determined in consideration of the specifications, the cost, the area to be occupied and the like of the inverter 100.

In the present embodiment, the high-level and low-level settings of logical values in a logic circuit are merely exemplary, and they can be freely changed by inverting them as appropriate by an inverter or the like. For example, the logic control unit 40 may set the first period φ1 to the eighth period φ8 by inverting the peak edge and the bottom edge.

In the present embodiment, a description has been given of a case where the high-side transistors in transistors constituting the H-bridge circuit 10 are formed by N-channel MOSFETs. However, P-channel MOSFETs may be used instead.

In the present embodiment, a description has been given of a case where in the light emitting apparatus 200 the inverter 100 is connected to the both ends of the EEFL 210 which is driven by drive voltages of reversed phases. However, this should not be considered as limiting. Also, a fluorescent tube to be driven is not limited to the EEFL and may be other fluorescent tubes such as CCFL. Also, a load driven by the inverter 100 according to the present embodiment is not limited to the fluorescent tube and may be applied to the driving of other various devices that require AC high voltage.

While the preferred embodiments of the present invention have been described using specific terms, such description is for illustrative purposes only, and it is to be understood that changes and variations may be made without departing from the spirit or scope of the appended claims.

What is claimed is:

1. An inverter, comprising:
   a transformer;
   a first high-side transistor one end of which is connected to an input terminal where an input voltage is applied and the other end of which is connected to a first terminal of a primary coil of said transformer;
   a first low-side transistor one end of which is connected to a potential fixed terminal where a potential is fixed and the other end of which is connected to the first terminal of the primary coil;
   a second high-side transistor one end of which is connected to the input terminal and the other end of which is connected to a second terminal of the primary coil;
   a second low-side transistor one end of which is connected to the potential fixed terminal and the other end of which is connected to the second terminal of the primary coil;
   a current-voltage converter which converts current through a secondary coil of said transformer into voltage so as to be outputted as a detection voltage;
   a triangular wave signal generator which generates a triangular wave signal;
   an error amplifier which outputs an error voltage corresponding to error between the detection voltage and a predetermined reference voltage; and
   a logic control unit which controls on and off of said first and said second high-side transistor and said first and said second low-side transistor, based on the error voltage outputted from said error amplifier and the triangular wave signal generated by said triangular wave signal generator,
   wherein said logic control unit turns on said first high-side transistor and said second low-side transistor in a first period during which the triangular wave signal starts from a bottom edge thereof until it reaches the error voltage,
   then said logic control circuit turns on said first high-side transistor in a second period until the triangular wave signal reaches a peak edge,
   then said logic control circuit turns on said second high-side transistor in a third period until the triangular wave signal reaches a bottom edge,
   then said logic control circuit turns on said first low-side transistor and said second high-side transistor in a fourth period until the triangular wave signal reaches again the error voltage,
   then said logic control circuit turns on said second high-side transistor in a fifth period until the triangular wave signal reaches again a peak edge, and
   then said logic control circuit turns on said first high-side transistor in a sixth period until the triangular wave signal reaches again a bottom edge.

2. An inverter according to claim 1, wherein during a period, in the fifth period, from when the triangular wave signal reaches the error voltage until a first predetermined off-time elapses, said logic control unit turns off said first high-side transistor, and
   after the first off-time has elapsed, said logic control unit turns on the first high-side transistor.

3. An inverter according to claim 1, wherein during a period, in the second period, from when the triangular wave signal reaches the error voltage until a second predetermined off-time elapses, said logic control unit turns off said second high-side transistor, and
   after the second off-time has elapsed, said logic control unit turns on the second high-side transistor.

4. An inverter according to claim 1, wherein a transition time from a bottom edge of the triangular wave signal till a peak edge thereof is set to a range of 2 to 100 times a transition time from a peak edge till a bottom edge.

5. An inverter according to claim 1, wherein said logic control unit controls the on and off of said first and said second high-side transistor and said first and said second low-side transistor by inverting the peak edge and the bottom edge.

6. An inverter according to claim 1, wherein said first and said second high-side transistor and said first and said second low-side transistor are each constituted by a MOSFET.

7. An inverter according to claim 1, wherein said triangular wave signal generator, said error amplifier and said logic control unit are integrated on a single semiconductor substrate.

8. A light emitting apparatus, comprising:
   a fluorescent lamp; and
   an inverter according to claim 1 which supplies drive voltage to said fluorescent lamp.

9. A light emitting apparatus according to claim 8, wherein two of said inverters are provided at both ends of said fluorescent lamp, respectively, and supply drive voltages of mutually reversed phases to said fluorescent lamp.

10. A light emitting apparatus according to claim 8, wherein said fluorescent lamp is a cold cathode fluorescent lamp.

11. A light emitting apparatus according to claim 8, wherein said fluorescent lamp is an external electrode fluorescent lamp.

12. A liquid-crystal display, comprising:
    a liquid-crystal panel; and
    a plurality of light emitting apparatuses, according to claim 8, arranged on a backside of said liquid-crystal panel.

13. A method for driving an inverter, comprising:
    converting current through a secondary coil of a transformer into voltage so as to be converted to a detection voltage;

generating an error voltage corresponding to error between the detection voltage and a predetermined reference voltage; and controlling on and off of a first and a second high-side transistor and a first and a second low-side transistor that constitute an H-bridge circuit, based on the error voltage and a triangular wave signal, wherein, in said controlling, the first high-side transistor and the second low-side transistor are turned on in a first period during which the triangular wave signal starts from a bottom edge thereof until it reaches the error voltage, then the first high-side transistor is turned on in a second period until the triangular wave signal reaches a peak edge, then the second high-side transistor is turned on in a third period until the triangular wave signal reaches a bottom edge, then the first low-side transistor and the second high-side transistor are turned on in a fourth period until the triangular wave signal reaches again the error voltage, then the second high-side transistor is turned on in a fifth period until the triangular wave signal reaches again a peak edge, and then the first high-side transistor is turned on in a sixth period until the triangular wave signal reaches again a bottom edge.

14. An inverter, comprising:
a transformer;
a first high-side transistor one end of which is connected to an input terminal where an input voltage is applied and the other end of which is connected to a first terminal of a primary coil of said transformer;
a first low-side transistor one end of which is connected to a potential fixed terminal where a potential is fixed and the other end of which is connected to the first terminal of the primary coil;
a second high-side transistor one end of which is connected to the input terminal and the other end of which is connected to a second terminal of the primary coil;
a second low-side transistor one end of which is connected to the potential fixed terminal and the other end of which is connected to the second terminal of the primary coil;
a pulse width modulator which monitors current through a secondary coil of said transformer and which adjusts a pulse-width-modulation signal by a feedback so that the current through the secondary coil is brought close to the a predetermined current value; and
a logic control unit which controls on and off of said first and said second high-side transistor and said first and said second low-side transistor, based on the pulse-width-modulation signal generated by said pulse width modulator,
said logic control unit including:
a timing control unit which outputs a control signal specifying the on and off of said first and said second high-side transistor and said first and said second low-side transistor;
a first comparator which compares a first switching voltage appearing at the first terminal of the primary coil with a first threshold voltage and which outputs a first comparison signal that goes to a predetermined level when the first switching voltage is higher than the first threshold voltage; and
a predriver which controls the on and off of said first and said second high-side transistor and said first and said second low-side transistor, based on the control signal outputted from the timing control unit and the first comparison signal outputted from the first comparator, wherein the predriver takes a logical sum of the control signal outputted from the timing control unit and the first comparison signal outputted from the first comparator, and turns on said first high-side transistor when on is specified to said first high-side transistor and the first comparison signal goes to the predetermined level.

15. An inverter according to claim 14, wherein said pulse width modulator and said logic control unit are integrated on a single semiconductor substrate.

16. A light emitting apparatus, comprising:
a fluorescent lamp; and
an inverter according to claim 14 which supplies drive voltage to said fluorescent lamp.

17. A liquid-crystal display, comprising:
a liquid-crystal panel; and
a plurality of light emitting apparatuses, according to claim 16, arranged on a backside of said liquid-crystal panel.

18. A light emitting apparatus according to claim 16, wherein two of said inverters are provided at both ends of said fluorescent lamp, respectively, and supply drive voltages of mutually reversed phases to said fluorescent lamp.

19. A light emitting apparatus according to claim 18, wherein said fluorescent lamp is a cold cathode fluorescent lamp.

20. A light emitting apparatus according to claim 18, wherein said fluorescent lamp is an external electrode fluorescent lamp.

21. An inverter according to claim 14, wherein when the timing control unit outputs a control signal specifying off to said first low-side transistor and then a first predetermined off-time has elapsed, the timing control unit outputs a control signal specifying on to said first high-side transistor.

22. An inverter according to claim 21, wherein said first and said second high-side transistor and said first and said second low-side transistor are each constituted by a MOSFET (Metal Oxide Semiconductor Field Effect Transistor).

23. An inverter according to claim 21, wherein said logic control unit further includes a second comparator which compares a second switching voltage appearing at the second terminal of the primary coil with a second threshold voltage and which outputs a second comparison signal that goes to a predetermined level when the second switching voltage is higher than the second threshold voltage,
wherein when the timing control unit outputs a control signal specifying off to said second low-side transistor and then a second predetermined off-time has elapsed, the timing control unit outputs a control signal specifying on to said second high-side transistor, and
wherein when on of said second high-side transistor is specified and the second comparison signal goes to the predetermined level, the predriver turns on said second high-side transistor.

24. An inverter according to claim 23, wherein when the timing control unit outputs a control signal specifying off to said second low-side transistor and then a second predetermined off-time has elapsed, the timing control unit outputs a control signal specifying on to said second high-side transistor.

25. An inverter according to claim 24, wherein said pulse width modulator includes:
an error amplifier which outputs an error voltage according to a difference between a detection voltage according to a current through the secondary coil of said transformer and a predetermined reference voltage;

a triangular wave signal generator which generates a triangular wave signal; and a pulse-width modulation comparator which compares the triangular wave signal with the error voltage and outputs the pulse-width-modulation signal, wherein the timing control unit outputs a control signal repeatedly specifying on to:

said first high-side transistor and said second low-side transistor in a period during which the triangular wave signal starts from a bottom edge thereof until it reaches the error voltage, then said first high-side transistor in a period until the second off-time has elapses, then said first and said second high-side transistor in a period until the triangular wave signal reaches a peak edge, then said second high-side transistor in a period until the triangular wave signal reaches a bottom edge, then said first low-side transistor and said second high-side transistor in a period until the triangular wave signal reaches again the error voltage, then said second high-side transistor in a period until the first off-time has elapsed, then said first and said second high-side transistor in a period until the triangular wave signal reaches again a peak edge, and then said first high-side transistor in a period until the triangular wave signal reaches again a bottom edge.

26. An inverter according to claim 25, wherein a transition time from a bottom edge of the triangular wave signal till a peak edge thereof is set to a range of 2 to 100 times a transition time from a peak edge till a bottom edge.

27. An inverter according to claim 25, wherein the timing control unit in said logic control unit outputs the control signal by inverting the peak edge and the bottom edge.

* * * * *